(12) United States Patent
Kitayama et al.

(10) Patent No.: US 10,598,822 B2
(45) Date of Patent: Mar. 24, 2020

(54) OPTICAL RESIN MATERIAL AND OPTICAL FILM

(71) Applicant: KANEKA CORPORATION, Osaka-shi, Osaka (JP)

(72) Inventors: Fuminobu Kitayama, Hyogo (JP); Nobuyoshi Maizuru, Hyogo (JP); Keisuke Hatano, Osaka (JP)

(73) Assignee: KANEKA CORPORATION, Osaka (JP)

( * ) Notice: Subject to any disclaimer, the term of this patent is extended or adjusted under 35 U.S.C. 154(b) by 472 days.

(21) Appl. No.: 14/782,243

(22) PCT Filed: Jun. 26, 2013

(86) PCT No.: PCT/JP2013/003995
§ 371 (c)(1),
(2) Date: Oct. 2, 2015

(87) PCT Pub. No.: WO2014/162370
PCT Pub. Date: Oct. 9, 2014

(65) Prior Publication Data
US 2016/0025898 A1    Jan. 28, 2016

(30) Foreign Application Priority Data

Apr. 5, 2013    (JP) ................................. 2013-080010

(51) Int. Cl.
| | | |
|---|---|---|
| *G02B 1/04* | (2006.01) | |
| *C08L 51/06* | (2006.01) | |
| *C08F 265/06* | (2006.01) | |
| *C08J 5/18* | (2006.01) | |
| *G02B 5/32* | (2006.01) | |
| *B32B 27/30* | (2006.01) | |
| *G02B 5/30* | (2006.01) | |

(52) U.S. Cl.
CPC .............. *G02B 1/04* (2013.01); *B32B 27/308* (2013.01); *C08F 265/06* (2013.01); *C08J 5/18* (2013.01); *C08L 51/06* (2013.01); *G02B 5/32* (2013.01); *C08J 2351/04* (2013.01); *G02B 5/30* (2013.01)

(58) Field of Classification Search
CPC .. G02B 1/04; G02B 5/32; C08L 33/08; C08L 33/10; C08L 51/06; C08F 265/06; C08F 2/22; C08J 5/18
See application file for complete search history.

(56) References Cited

U.S. PATENT DOCUMENTS

| | | | | |
|---|---|---|---|---|
| 4,373,065 | A | 2/1983 | Prest, Jr. | |
| 6,348,542 | B1* | 2/2002 | Naruse | .................. C08F 285/00 |
| | | | | 524/504 |
| 2007/0243364 | A1* | 10/2007 | Maekawa | ............. C08L 33/064 |
| | | | | 428/220 |
| 2008/0318072 | A1* | 12/2008 | Kawabata | .............. C08G 73/10 |
| | | | | 428/461 |
| 2009/0306321 | A1 | 12/2009 | Koike | |
| 2010/0168331 | A1 | 7/2010 | Terada | |
| 2012/0046416 | A1* | 2/2012 | Pirri | ...................... C08F 265/06 |
| | | | | 525/199 |

FOREIGN PATENT DOCUMENTS

| | | | |
|---|---|---|---|
| CN | 1946794 | | 4/2007 |
| EP | 1705195 | | 9/2006 |
| JP | 59-066411 | | 4/1984 |
| JP | 62-004711 | | 1/1987 |
| JP | 62-151415 | | 7/1987 |
| JP | 04076013 A | * | 3/1992 |
| JP | 11-293116 | | 10/1999 |
| JP | 2001-318202 | | 11/2001 |
| JP | 3648201 | | 5/2005 |
| JP | 3696649 | | 9/2005 |
| JP | 2006-308682 | | 11/2006 |
| JP | 2009-203348 | | 9/2009 |
| JP | 2009-203435 | | 9/2009 |
| JP | 2010-096919 | | 4/2010 |
| JP | 4624845 | | 2/2011 |
| JP | 2012149268 A | * | 8/2012 |
| JP | 5142938 | | 2/2013 |
| WO | 2010/119730 | | 10/2010 |

OTHER PUBLICATIONS

Machine translation of JP3696649. Retrieved Jun. 25, 2016.*
Machine translation of JP3648201. Retrieved Jun. 25, 2016.*
Machine translation of JPH04-076013. Retrieved Dec. 19, 2017.*
Machine translation of JP2012-149268. Retrieved Sep. 9, 2019.*
Office Action issued for counterpart Chinese Patent Application No. 201380075422.9, dated Mar. 13, 2017, 14 pages including partial English translation.
Extended European Search Report for European Application No. 13880782.1, dated Nov. 25, 2016, 6 pages.
International Search Report issued in International Application No. PCT/JP2013/003995, dated Sep. 10, 2013, 2 pages.
International Preliminary Report on Patentability, issued in International Application No. PCT/JP2013/003995, dated Sep. 10, 2013, 5 pages.
Office Action issued in corresponding Taiwanese Patent Application No. 10321798930, dated Dec. 25, 2014, 9 pages with a partial English Translation.

* cited by examiner

*Primary Examiner* — Prashant J Khatri

(74) *Attorney, Agent, or Firm* — Hamre, Schumann, Mueller & Larson, P.C.

(57) ABSTRACT

An object of the present invention is to provide an optical resin material and an optical film, which are very small in both orientation birefringence and photoelastic birefringence, excellent in transparency, have few defects due to foreign substances, and are excellent in heat resistance and mechanical strength. Provided is an optical resin material containing a graft copolymer (C) obtained by polymerizing a vinyl-based monomer mixture (B) in the presence of a vinyl-based polymer (A) having at least one crosslinked structure layer, wherein the graft copolymer (C) has an orientation birefringence of $-15 \times 10^{-4}$ to $15 \times 10^{-4}$ and a photoelastic constant of $-10 \times 10^{-12}$ to $10 \times 10^{-12}$ Pa$^{-1}$.

26 Claims, No Drawings

OPTICAL RESIN MATERIAL AND OPTICAL FILM

TECHNICAL FIELD

The present invention relates to an optical resin material and an optical film.

BACKGROUND ART

Light-permeable resins are widely used as materials for forming film-, plate-, and lens-like optical members for use in various optical devices (e.g., films, substrates, and prism sheets for use in liquid crystal display devices; lenses in lens systems for signal reading of optical disk devices; and Fresnel lenses and lenticular lenses for projection screens). Such resins are generally called "optical resins" or "optical polymers."

Birefringence is one of important optical characteristics that should be taken into consideration when optical resins are used to form optical members. That is, in most cases, it is undesirable that optical resins have high birefringence. Particularly, in the above-mentioned applications (liquid crystal display devices, optical disk devices, projection screens, etc.), the presence of a birefringent film or lens in an optical path adversely affects image quality or signal reading performance, and therefore the use of an optical member made of an optical resin whose birefringence is as low as possible is desired. Needless to say, camera lenses, eyeglass lenses, and the like also preferably have low birefringence.

Meanwhile, as is well known in the art, birefringence of an optical polymer includes "orientation birefringence" mainly caused by the orientation of main chains of the polymer and "photoelastic birefringence" caused by stress. Orientation birefringence and photoelastic constant have their respective signs that depend on the chemical structure of a polymer, and are properties intrinsic to individual polymers.

That is, orientation birefringence generally develops when main chains of a chain-like polymer (polymer chains) are oriented, and this orientation of main chains occurs in a process involving the flow of a material, such as an extrusion molding or stretching process during production of a polymer film or an injection molding process frequently used for production of optical members having various shapes, and is fixed and remains in an optical member. Hereinafter, the phrase "orientation birefringence is positive" means that the refractive index is large in a direction parallel to the orientation direction of polymer chains, and the phrase "orientation birefringence is negative" means that the refractive index is large in a direction orthogonal to the orientation direction of polymer chains.

On the other hand, photoelastic birefringence is caused by elastic deformation (distortion) of a polymer. In the case of an optical member formed by using a polymer, elastic deformation (distortion) occurs and remains in its material due to, for example, volume contraction caused by cooling from a temperature around the glass transition temperature of the polymer to a temperature lower than that, and causes photoelastic birefringence. Further, the material is elastically deformed also by, for example, external force exerted on the optical member fixed to a device used at ordinary temperature (glass transition temperature or lower), which causes photoelastic birefringence. Hereinafter, the phrase "photoelastic birefringence is positive" means that the refractive index is large in a direction parallel to a direction in which tensile stress is applied (direction in which polymer chains are oriented), and the phrase "photoelastic birefringence is negative" means that the refractive index is large in a direction orthogonal to a direction in which tensile stress is applied.

There are various studies about reports on the suppression of birefringence. For example, PTL 1 discloses a non-birefringent optical resin material obtained by blending two polymer resins that are opposite in sign of orientation birefringence to each other and are completely compatible. However, it is difficult to uniformly mix the two polymer resins described in PTL 1 to obtain a practical polymer resin that uniformly exhibits low orientation birefringence as a whole, and aggregates of the polymer resins may cause defects due to foreign substances. Further, the polymer resins blended are different in their intrinsic refractive index, and therefore light scattering occurs due to non-uniformity of refractive index, which makes it impossible to obtain an optical material excellent in transparency. Although there is no description about photoelastic birefringence, it is conceivable that a polymer composition of an example will have significantly high photoelastic birefringence. Further, the mechanical strength, especially impact resistance, of the optical resin material is not always sufficient, which causes problems such as cracks when the optical resin material is practically used.

PTL 2 discloses a method for obtaining a non-birefringent optical resin material by adding, to a matrix formed of a transparent polymer resin, a low molecular substance whose orientation birefringence tends to cancel out the orientation birefringence of the polymer resin material. The low molecular substance has a molecular weight of 5000 or less, and a resulting molded body has excellent transparency. However, there is no description about improvement in photoelastic birefringence or mechanical strength.

PTL 3 discloses a method for obtaining an optical resin material having low orientation birefringence by adding, to a transparent polymer resin, a birefringent fine inorganic substance that is oriented in the same direction as the linked chains of the polymer resin as the polymer resin is oriented by the application of external force. Orientation birefringence can be suppressed also by this method, but there is no description about improvement in photoelastic birefringence or mechanical strength.

PTL 4 discloses a method for obtaining a non-birefringent optical resin material having low orientation birefringence and low photoelastic birefringence, in which an optical material having a multicomponent system of three or more components including a binary or higher copolymerization system is obtained by selecting the combination and constituent ratio (compositional ratio) of components of the multicomponent system so that both the orientation birefringence and photoelastic birefringence of the optical material are cancelled out at the same time. This method makes it possible to extremely reduce both orientation birefringence and photoelastic birefringence at the same time, which was unable to be achieved heretofore. However, the composition of the optical resin material is limited to some extent to make it possible to cancel out both orientation birefringence and photoelastic birefringence at the same time, and therefore the glass transition temperature of the optical resin material is as low as lower than 80° C., and there is a problem such as a reduction in mechanical strength. Further, there is also a problem that polymer decomposition occurs during molding performed under such conditions that the optical resin material is retained at high temperature, such as melt extrusion molding for forming a film.

PTL 5 discloses a method for obtaining a resin composition, which has high heat resistance and exhibits excellent mechanical strength, especially bending resistance, when formed into a film, and an optical film. The resin composition and the optical film are obtained by using, in combination, an acrylic resin having a glass transition temperature of 120° C. or higher and a graft copolymer obtained by graft copolymerization of an acrylic rubber-like polymer and a vinyl group-polymerizable monomer ("core-shell"-type impact resistance improver, hereinafter also referred to as "core-shell polymer"). However, no data of orientation birefringence and photoelastic birefringence are shown in the examples, and therefore it is unclear whether the graft copolymer is effective at improving birefringence. Particularly, there is no description about improvement in photoelastic birefringence in the specification. PTL 5 states that the graft copolymer is added to improve mechanical strength. However, there is no description about the influence of the graft copolymer on birefringence and there is no description about the orientation birefringence and photoelastic birefringence in the examples, from which it is apparent that PTL 5 has no technical idea of imparting a function of adjusting birefringence to the graft copolymer.

PTL 6 discloses an optical film obtained by molding a resin composition containing an acrylic resin and an acrylic rubber. The acrylic resin is a heat-resistant acrylic resin containing a repeating unit derived from a methacrylate monomer, a repeating unit derived from a vinyl aromatic monomer, a repeating unit derived from a methacrylate monomer having an aromatic group, and a cyclic acid anhydride repeating unit. This literature states that the optical film has high heat resistance and excellent trimming property and has excellent optical characteristics even when stretched. Although there is a description about improvement in trimming property, there is no description about the mechanical strength of the film other than trimming property, such as crack resistance on film bending, and therefore it is unclear from this literature whether the mechanical strength of the optical film is at such a level that the optical film can be practically used without problem. Further, optical films stretched 100% (stretched twice) in the examples have high birefringence (orientation birefringence), and none of the optical films of the examples is low in both orientation birefringence and photoelastic constant (photoelastic birefringence), and therefore improvement in birefringence is not sufficiently achieved. Further, as shown in the examples, the acrylic rubber described in this literature is a so-called graft copolymer (core-shell polymer), and this literature states that the acrylic rubber is added to improve mechanical strength while maintaining transparency such as haze. However, the influence of the acrylic rubber on birefringence is not taken into consideration at all. For example, when a comparison is made between examples and comparative examples, the orientation birefringences of the optical films of examples to which the acrylic rubber is added are adversely higher than those of optical films of comparative examples in which only the acrylic resin is used, and the photoelastic constants (photoelastic birefringences) of the optical films of examples are equal to those of the optical films of comparative examples in which only the acrylic resin is used. Further, the heat-resistant acrylic resin has a negative photoelastic constant, and the acrylic rubber is also estimated to have a negative photoelastic constant from the composition thereof. Accordingly, it is apparent that the acrylic rubber deteriorates orientation birefringence and photoelastic birefringence, that is, this literature discloses no technical idea that the acrylic rubber is used to adjust orientation birefringence and photoelastic birefringence.

CITATION LIST

Patent Literatures
  PTL 1: U.S. Pat. No. 4,373,065
  PTL 2: JP 3696649 B1
  PTL 3: JP 3648201 B1
  PTL 4: JP 4624845 B1
  PTL 5: JP 2009-203348 A
  PTL 6: JP 5142938 B1

SUMMARY OF INVENTION

Technical Problem

An object of the present invention is to provide an optical resin material and an optical film, which are very small in both orientation birefringence and photoelastic birefringence, excellent in transparency, have few defects due to foreign substances, and are excellent in heat resistance and mechanical strength.

Solution to Problem

In optical members, particularly in optical films, high heat resistance and high mechanical strength are required in many cases. Particularly, when used as an optical film for liquid crystal displays, such film needs to have high heat resistance, because it is exposed to high temperature when subjected to a film coating process or the like during production as well as when practically used. Further, the optical film needs to have mechanical strength such as trimming property or crack resistance in a punching process or the like performed after film coating or bonding to another member as well as during film production.

However, as in the conventional techniques described above, it is difficult to design a polymer to make two types of resins completely compatible when blended while controlling the birefringence. It is also difficult to approximate both orientation birefringence and photoelastic birefringence of such resins to zero and satisfy mechanical strength and heat resistance by the addition of an organic low molecular compound or an inorganic substance. Since the polymer design is considerably limited due to birefringence control in a method using an optical material having a multicomponent system of three or more components including a binary or higher copolymerization system, it is particularly difficult to satisfy mechanical strength and heat resistance. Therefore, for practical use, optical resin materials and optical films satisfying non-birefringence, mechanical strength, and heat resistance at the same time have been desired.

In view of the above circumstances, the present inventors have conducted intensive studies, and newly found that, even in polymers of the same composition, the development of birefringence is significantly different depending on whether or not a crosslinked structure is formed. Specifically, the present inventors have found that a crosslinked polymer layer has a small contribution to birefringence in a multilayer structure having at least one crosslinked structure layer (graft copolymer), but a hard polymer layer has a large contribution to birefringence. From this fact, the present inventors have found that a polymer design to reduce such birefringence of the hard polymer layer can realize non-birefringence of the whole graft copolymer.

Furthermore, since the crosslinked polymer layer and the hard polymer layer are covalently bonded to each other in the graft copolymer, it has also been discovered that a molded body in which an island domain consisting of a crosslinked polymer layer is uniformly dispersed can be formed and that the molded body satisfies heat resistance at the same time with high mechanical strength. In addition, compared to the method using two types of polymer blends in the prior art, there is little need to consider the compatibility among the polymers. Based on these findings, the present inventors have succeeded in realizing high degree of freedom in the polymer design and obtaining a better optical resin material and a better optical film, and thereby completed the present invention.

More specifically, the present invention relates to an optical resin material containing a graft copolymer (C) obtained by polymerizing a vinyl-based monomer mixture (B) in the presence of a vinyl-based polymer (A) having at least one crosslinked structure layer, wherein the graft copolymer (C) has an orientation birefringence of $-15 \times 10^{-4}$ to $15 \times 10^{-4}$ and a photoelastic constant of $-10 \times 10^{-12}$ to $10 \times 10^{-12}$ $Pa^{-1}$.

In the optical resin material of the present invention, the vinyl-based monomer mixture (B), when homopolymerized, preferably has an orientation birefringence of $-15 \times 10^{-4}$ to $15 \times 10^{-4}$ and a photoelastic constant of $-10 \times 10^{-12}$ to $10 \times 10^{-12}$ Pa.

In the optical resin material of the present invention, at least one layer of the crosslinked structure layer(s) is preferably a soft layer.

In the optical resin material of the present invention, the vinyl-based polymer (A) preferably has a (meth)acrylic crosslinked polymer layer.

In the optical resin material of the present invention, the graft copolymer (C) preferably has a hard polymer layer.

In the optical resin material of the present invention, the graft copolymer (C) preferably has a hard polymer layer having a non-crosslinked structure.

In the optical resin material of the present invention, the vinyl-based polymer (A) is preferably formed by polymerizing 50 to 100 wt % of an alkyl acrylate, 50 to 0 wt % of a monomer copolymerizable therewith, and 0.05 to 10 parts by weight of a polyfunctional monomer (with respect to 100 parts by weight of the total amount of the alkyl acrylate and the monomer copolymerizable therewith).

In the optical resin material of the present invention, the graft copolymer (C) preferably has a soft inner layer having a crosslinked structure and a hard non-birefringent outer layer, and the inner layer has a (meth)acrylic crosslinked polymer layer.

In the optical resin material of the present invention, the graft copolymer (C) preferably has a hard inner layer, a soft intermediate layer, and a hard outer layer, the inner layer is composed of at least one kind of hard polymer layer, the intermediate layer has a soft polymer layer of a (meth)acrylic crosslinked polymer, and the outer layer has a hard non-birefringent polymer layer.

In the optical resin material of the present invention, the graft copolymer (C) preferably further has a soft innermost layer.

In the optical resin material according to any one of claims 1 to 10, the volume average particle diameter to a crosslinked structure layer located on the outermost side of at least one crosslinked structure layer of the graft copolymer (C) is 20 to 450 nm.

In the optical resin material of the present invention, the content of a crosslinked structure polymer of the vinyl-based polymer (A) is preferably 1 to 60 parts by weight with respect to 100 parts by weight of the optical resin material.

The optical resin material of the present invention may further contain inorganic fine particles having birefringence.

The optical resin material of the present invention may further contain a low molecular compound having birefringence.

The optical resin material of the present invention may further contain a resin (D) having an orientation birefringence of $-15 \times 10^{-4}$ to $15 \times 10^{-4}$ and a photoelastic constant of $-10 \times 10^{-12}$ to $10 \times 10^{-12}$ $Pa^{-1}$.

The optical material of the present invention is formed by molding the optical resin material of the present invention.

The optical film of the present invention is made of the optical resin material of the present invention.

The optical film of the present invention can be obtained by a melt extrusion method.

In the optical film of the present invention, the thickness is preferably 10 to 500 μm.

In the optical film of the present invention, the orientation birefringence is preferably $-2 \times 10^{-4}$ to $2 \times 10^{-4}$ and the photoelastic constant is preferably $-10 \times 10^{-12}$ to $10 \times 10^{-12}$ $Pa^{-1}$.

In the optical film of the present invention, the glass transition temperature if preferably 80° C. or higher.

In the optical film of the present invention, the tensile elongation at break is preferably 10% or more.

The optical film of the present invention is preferably an acrylic resin film.

The optical film of the present invention may be an unstretched film.

The optical film of the present invention may be stretched.

The laminate of the present invention is formed by laminating the optical film of the present invention on a substrate.

Advantageous Effects of Invention

A molded article that is very small in both orientation birefringence and photoelastic birefringence, excellent in transparency, has few defects due to foreign substances, is excellent in heat resistance, and has a mechanical strength can be obtained from the optical resin material in accordance with the present invention. The resulting molded article is suitable for optical members, especially suitable for optical films.

The optical film of the present invention is very small in both orientation birefringence and photoelastic birefringence, excellent in transparency, has few defects due to foreign substances, and is excellent in heat resistance and mechanical strength.

DESCRIPTION OF EMBODIMENTS

Hereinafter, the embodiments of the present invention will be described in detail. However, the present invention is not limited to these embodiments.

The optical resin material of the present invention contains, as an essential component, a graft copolymer (C) obtained by polymerizing a vinyl-based monomer mixture (B) in the presence of a vinyl-based polymer (A) having at least one crosslinked structure layer, wherein the orientation birefringence of the graft copolymer (C) satisfies $-15 \times 10^{-4}$ to $15 \times 10^{-4}$ and the photoelastic constant of the graft copolymer (C) satisfies $-10 \times 10^{-12}$ to $10 \times 10^{-12}$ $Pa^{-1}$.

Here, the technical concept of the present invention will be described.

(1) Technical Concept of Forming Multilayer Structure Containing Crosslinked Structure The graft copolymer (C) of the present invention is obtained by polymerizing a vinyl-based monomer mixture (B) in the presence of a vinyl-based monomer (A) having at least one crosslinked structure layer (crosslinked polymer layer). Thus, when manufacturing a molded body from an optical resin material containing the graft copolymer (C), it is possible to form a "sea-island structure," in which a layer formed by polymerizing the vinyl-based monomer mixture (B) is a matrix (sea) and a crosslinked polymer layer which is dispersed in the matrix is a domain (island) in the molded body.

In particular, when the graft copolymer (C) of the present invention has a structure in which at least one layer of crosslinked polymer layers of the vinyl-based polymer (A) is "soft" and a layer formed by polymerizing the vinyl-based monomer mixture is "hard," the graft copolymer (C) has a discontinuous sea-island structure having a form in which the soft island domain is dispersed in the hard resin layer. Therefore, it is possible to dramatically improve the mechanical strength and realize high heat resistance at the same time. Apart from this technical concept, a method of adding a soft polymer (for example, an elastomer) in order to improve the mechanical strength is also mentioned. However, in this case, the matrix resin and the soft polymer are mixed uniformly, so that heat resistance of the resulting molded body is deteriorated.

Furthermore, when the crosslinked structure layer of the vinyl-based polymer (A) is adjusted to a sub-micron size and the surface of the vinyl-based polymer (A) is further covered with a polymer of the vinyl-based monomer mixture (B), the size of the dispersed domain (island) is fixed to a sub-micron size, and such domain is never aggregated/enlarged to several millimeters or centimeters. Therefore, transparency of the polymer is less likely to deteriorate and foreign substances such as fish eyes cannot be easily generated. In addition, even if the refractive index is somewhat deviated between the domain and the matrix (the island and the sea), it is possible to reduce the degree of deterioration of transparency.

(2) Technical Concept of Reducing Birefringence

The graft copolymer (C) of the present invention is characterized by having an orientation birefringence of $-15 \times 10^{-4}$ to $15 \times 10^{-4}$ and a photoelastic constant of $10 \times 10^{-12}$ to $-10 \times 10^{-12}$ $Pa^{-1}$.

In order to achieve optical isotropy, how to reduce orientation birefringence and photoelastic birefringence is important Therefore, the concepts of "orientation birefringence" and "photoelastic birefringence" of the graft copolymer (C), the optical resin material, and the optical film in the present invention will be described here.

(Concept of Orientation Birefringence)

When a film is produced not by molding performed under such conditions that a polymer is oriented in a film, such as high discharge conditions, film take-up conditions, or low temperature molding, but by normal melt extrusion molding, a polymer is not very highly oriented in the film. Actually, in the case of an acrylic resin typified by PMMA, its film formed by melt extrusion without intentionally subjected to a stretching process (hereinafter, also referred to as "original film" or "raw material film") does not have very high birefringence, and therefore can sometimes be practically used without problem depending on its intended use. Of course, when a film is formed by molding performed under such conditions that a polymer is oriented or an original film is subjected to a stretching process, a polymer is oriented in the film so that the film has birefringence. Such birefringence is due to polymer orientation, and is therefore generally called orientation birefringence. In order to reduce the birefringence of the molded body obtained from the optical resin material of the present invention, especially the optical film, depending on how the optical resin material of the present invention is molded or, in the case of a film, whether the film is stretched or not, it is necessary to reduce the orientation birefringence of the graft copolymer (C). Conversely, when polymer orientation hardly occurs in a molded body such as a film, so that the birefringence of the molded body is sufficiently low, the orientation birefringence of the graft copolymer (C) does not need to be greatly taken into consideration and is therefore not particularly limited in the resin design.

Here, as described above, "orientation birefringence" of the present invention develops due to orientation of polymer chains, and birefringence (orientation birefringence) in a polymer film varies depending on the degree of orientation of polymer chains. Therefore, in the present invention, "orientation birefringence" is defined as measured under the following conditions.

The optical resin material, the graft copolymer (C), and the homopolymer of the vinyl-based monomer mixture (B) each need to be formed into some form of molded body for the measurement of their orientation birefringence. In the present invention, examples of the molded body are a film and a sheet. Hereinbelow, measurement of orientation birefringence will be described with reference to a case where the molded body is a melt-extrusion molded film or a press-molded sheet.

Measurement of "Orientation Birefringence" of Film

First, a test specimen of 25 mm×90 mm is cut out (so that the long sides are in the MD direction) from a film (original film) having a thickness of 125 µm, both the short sides of the test specimen are held while the test specimen is maintained at a temperature higher by 30° C. than its glass transition temperature for 2 minutes, and the test specimen is uniaxially stretched twice (also referred to as "stretched 100%") at a rate of 200 mm/min in its longitudinal direction (at this time, both the long sides of the test specimen are not fixed). Thereafter, the thus obtained film is cooled to 23° C. and a sample is taken from the central portion of the film for the measurement of birefringence.

Measurement of "Orientation Birefringence" of Sheet

The graft copolymer (C) of the present invention may be difficult to be melt-extruded, depending on the composition of the polymer. Therefore, the orientation birefringence of the graft copolymer (C) is measured with use of its press-molded sheet. In addition, as with the graft copolymer (C), even when the optical resin material is difficult to be formed into a film, the orientation birefringence is measured using its press-molded sheet.

The following describes the measuring conditions of the "orientation birefringence" in the case of using a press-molded sheet.

First, the graft copolymer (C) is pressed at 190° C. to prepare a press-molded sheet having a thickness of 500 µm. A test specimen of 25 mm×90 mm is cut out from the central portion of the obtained press-molded sheet, both the short sides of the test specimen are held while the test specimen is maintained at a temperature higher by 30° C. than its glass transition temperature for 2 minutes, and the test specimen is uniaxially stretched twice (also referred to as "stretched 100%") at a rate of 200 mm/min in its longitudinal direction (at this time, both the long sides of the test specimen are not fixed). Thereafter, the thus obtained sheet is cooled to 23° C. and a sample is taken from the central portion of the sheet for the measurement of birefringence.

The above-mentioned "orientation birefingence" depends on the degree of polymer orientation, and is therefore influenced by various sample preparation conditions including stretching conditions. For this reason, evaluation conditions have been specified above. For example, the stretching temperature is preferably in the range of −30° C. to +30° C. of the glass transition temperature, more preferably in the range of +0° C. to +30° C. of the glass transition temperature, and may be appropriately set to a temperature in the range of, for example, +5° C. to +30° C. of the glass transition temperature. However, in order to determine the sign of birefringence of each sample and to quantitatively determine the relative magnitude relationship between samples, it is important to use measurement values obtained under the almost same measuring conditions such as stretching conditions.

Concept of Photoelastic Birefringence (Photoelastic Constant))

As has been described above, photoelastic birefringence is birefringence caused by elastic deformation (distortion) of a polymer in a molded body when stress is applied to the molded body. As shown by the following formula, a photoelastic constant is defined as a coefficient $\gamma$ of $\Delta\sigma$ at the time when a birefringence difference $\Delta n$ is caused by a stress difference $\Delta\sigma$.

$$\Delta n = \gamma \Delta \sigma$$

Here, when the refractive index increases in a direction parallel to the direction in which a tensile stress is being applied (the latter is the orientation direction of the polymer chains), this case is expressed as "photoelastic birefringence is positive" and when the refractive index increases in a direction perpendicular to the direction in which a tensile stress is being applied, this case is expressed as "photoelastic birefringence is negative."

In fact, the intrinsic "photoelastic constant" of the polymer is determined, which makes it possible to evaluate the degree of photoelastic birefringence of the material. First, stress is applied to the polymer material, and birefringence is measured when the polymer material is elastically distorted. A proportional constant between the obtained birefringence and the stress is defined as a photoelastic constant. The birefringences of polymers at the time when stress is applied to the polymers can be evaluated by comparing the photoelastic constants of the polymers.

As in the case of the measurement of orientation birefringence, the optical resin material, the graft copolymer (C), and the homopolymer of the vinyl-based monomer mixture (B) each need to be formed into some form of molded body for the measurement of their orientation birefringence. In the present invention, the molded body is defined as a film or a sheet. Hereinbelow, measurement of orientation birefringence will be described with reference to a case where the molded body is a melt-extrusion molded film or a press-molded sheet.

"Photoelastic Constant" of Film

As in the case of the above-mentioned "orientation birefringence," a strip-shaped test specimen of 15 mm×90 mm is cut out in a TD direction (so that the long side is in the TD direction) from a film (original film) having a thickness of 125 μm. Then, one of the long sides of the test specimen film is fixed, and a load is applied to the other long side while increasing the load from 0 kgf to 4 kgf by 0.5-kgf increments. In this state, birefringence at the application of each load is measured at 23° C. The magnitude of a change in birefringence per unit stress is calculated from the obtained results to determine a photoelastic constant.

"Photoelastic Constant" of Sheet

The graft copolymer (C) of the present invention may be difficult to be melt-extruded, depending on the composition of the polymer. Therefore, the photoelastic birefringence of the graft copolymer (C) is measured with use of its press-molded sheet. In addition, as with the graft copolymer (C), even when the optical resin material is difficult to be formed into a film, the orientation birefringence is measured using its press-molded sheet.

The following describes the measurement of the "photoelastic constant" in the case of using a press-molded sheet.

The graft copolymer (C) is pressed at 190° C. to prepare a press-molded sheet having a thickness of 500 μm. Then, a test specimen of 25 mm×90 mm is cut out from the central portion of the obtained press-molded sheet.

The measuring conditions and the calculation method are the same as those used in the case of the measurement of the melt-extrusion molded film.

When there is a large difference in thickness between samples to be compared, there is a possibility that how stress is applied in the samples varies, resulting in difficulty to strictly compare photoelastic constants between the samples. However, as for the sample of the film having a thickness of 125 μm and the sample of the press-molded sheet having a thickness of 500 μm described in the present invention, there is not a large difference in how stress is applied between them, and therefore it is possible to compare photoelastic constants between the samples as long as a difference in thickness between the samples is at such a level. Therefore, even the film and the press molded sheet can be suitably used for the measurement of photoelastic constant (birefringence). However, since there is a possibility of unevenness of the applied stress as the thickness of the evaluation sample is increased, it is more preferable to measure the photoelastic constant (birefringence) using a film. The same applies to the measurement of the orientation birefringence.

The photoelastic birefringence is an intrinsic property in the polymer structure, and it is known that additivity is established between the photoelastic constant of a resulting polymer (copolymer) and the photoelastic constants of homopolymers corresponding to monomer species used for copolymerization. From this fact, it is necessary to design a polymer in such a manner that the photoelastic constant of the graft copolymer (C) itself becomes smaller.

As for orientation birefringence, as described above, when the degree of polymer orientation in a molded body, especially an optical film, made of the optical resin material of the present invention is not so high and therefore the orientation birefringence of the molded body does not cause a problem in its practical use, it is not particularly necessary to consider the orientation birefringence in the design of the graft copolymer (C).

Here, a combination of the graft copolymer ("core/shell" type impact modifier) obtained by graft-polymerizing a vinyl group-polymerizable monomer to a rubber-like polymer, with the birefringent matrix described in Japanese Patent No. 4624845 described earlier, appears to achieve an increase in the mechanical strength and heat resistance in spite of the non-birefringence. However, there is a case where it is difficult to strictly make the matrix and the graft copolymer compatible with each other, and there is a possibility of agglomeration to form foreign substances because both are separated from each other at the time of precision molding. Further, in some cases, even if the non-birefringence of the matrix is reduced, there is a possibility that the birefringence occurs by placing the graft copolymer. Meanwhile, the present invention can produce a resin material made only from a graft copolymer (C), and such a resin material can readily achieve non-birefringence, as well as combination of mechanical strength and heat resistance. In other words, the degree of freedom of polymer design is increased as the need to consider the compatibility of the polymer is decreased, making it possible to provide a more excellent optical resin material.

In the present invention, the non-birefringent graft copolymer (C) when used as a molding material can simultaneously develop non-birefringent properties and physical properties such as mechanical strength, heat resistance, rigidity, and hardness. The vinyl-based polymer (A) having a crosslinked structure in the graft copolymer (C) has a moiety covalently bound to the polymer of the vinyl-based monomer mixture (B) as a matrix. Thereby, it becomes possible to uniformly disperse the island domain consisting of the vinyl-based polymer (A) having a crosslinked structure in the matrix.

Then, a detailed description of the graft copolymer (C) is given below.

<Vinyl-Based Polymer (A)>

Here, the vinyl-based polymer (A) contained in the graft copolymer (C) will be explained. The vinyl-based polymer (A) has at least one crosslinked structure layer.

The at least one layer of the crosslinked structure layer(s) may be "soft" or "hard" as long as it is a crosslinked polymer layer, but is preferably a "soft" polymer layer.

The term "soft" as used herein means that the glass transition temperature of the polymer is lower than 20° C. From the viewpoint of enhancing the impact absorption capacity of the soft layer and enhancing an impact resistance improving effect such as crack resistance, the glass transition temperature of the polymer is preferably lower than 0° C., more preferably lower than −20° C.

In the present application, the glass transition temperature of the "soft" or "hard" polymer is calculated by Fox equation using a value described in Polymer Hand Book (J. Brandrup, Interscience 1989) (for example, the glass transition temperature of polymethyl methacrylate is 105° C., and the glass transition temperature of polybutyl acrylate is −54° C.).

Any known polymer may be used as the "soft" polymer as long as its glass transition temperature is lower than 20° C., and in particular, a rubber-like polymer is preferably used. Specific examples of the rubber-like polymer include butadiene-based crosslinked polymers, (meth)acrylic crosslinked polymers, and organosiloxane-based crosslinked polymers. Among them, (meth)acrylic crosslinked polymers are particularly preferred in terms of the weather resistance (light resistance) and transparency of the optical resin material and the optical film. Here, "(meth)acrylic" means "acrylic or methacrylic."

Hereinbelow, a (meth)acrylic crosslinked polymer layer will be described in detail as a preferred "soft" crosslinked polymer layer.

A (meth)acrylic crosslinked polymer in the (meth)acrylic crosslinked polymer layer is not particularly limited as long as it is a (meth)acrylic crosslinked polymer, but is preferably one obtained by polymerization of 50 to 100 wt % of an alkyl acrylate, 50 to 0 wt % of a vinyl monomer copolymerizable with the alkyl acrylate, and 0.05 to 10 parts by weight of a polyfunctional monomer (with respect to 100 parts by weight of the total amount of the alkyl acrylate and the vinyl monomer copolymerizable therewith) (the total amount of monofunctional monomer components)) from the viewpoint of impact resistance such as crack resistance. The (meth)acrylic crosslinked polymer layer may be a layer obtained by one stage polymerization performed by mixing all the monomer components or a layer obtained by polymerization performed in two or more stages while changing the composition of monomers.

The alkyl acrylate used here is preferably one whose alkyl group has 1 to 12 carbon atoms from the viewpoint of polymerization reactivity and cost, and the alkyl group may be either linear or branched. Specific examples of the alkyl acrylate include methyl acrylate, ethyl acrylate, propyl acrylate, n-butyl acrylate, isobutyl acrylate, t-butyl acrylate, 2-ethylhexyl acrylate, benzyl acrylate, n-octyl acrylate, β-hydroxyethyl acrylate, dimethylaminoethyl acrylate, and glycidyl acrylate, and these monomers may be used singly or in combination of two or more of them. The amount of the alkyl acrylate is preferably 50 to 100 wt %, more preferably 60 to 100 wt %, most preferably 70 to 100 wt % with respect to the total amount of the monofunctional monomers (with respect to the total amount of the alkyl acrylate and the vinyl monomer copolymerizable therewith). If the amount of the alkyl acrylate is less than 50 wt %, there is a case where the crack resistance of the film is deteriorated.

As an example of the monomer copolymerizable with the alkyl acrylate (hereinafter, sometimes referred to as "copolymerizable monomer"), an alkyl methacrylate can be mentioned. From the viewpoint of polymerizability and cost, the alkyl methacrylate is preferably one whose alkyl group has 1 to 12 carbon atoms, and the alkyl group may be linear or branched. Specific examples of the alkyl methacrylate include methyl methacrylate, ethyl methacrylate, propyl methacrylate, butyl methacrylate, 2-ethylhexyl methacrylate, benzyl methacrylate, octyl acrylate, β-hydroxyethyl methacrylate, dimethylaminoethyl methacrylate, and glycidyl methacrylate. In addition, examples of other copolymerizable monomers include vinyl halides (e.g. vinyl chloride and vinyl bromide), vinyl cyanides (e.g. acrylonitrile and methacrylonitrile), vinyl esters (e.g. vinyl formate, vinyl acetate, and vinyl propionate), aromatic vinyl compounds and derivatives thereof (e.g. styrene, vinyl toluene, and α-methylstyrene), vinylidene halides (e.g. vinylidene chloride and vinylidene fluoride), acrylic acid and salts thereof (e.g. acrylic acid, sodium acrylate, and calcium acrylate), methacrylic acid and salts thereof (e.g. methacrylic acid, sodium methacrylate, and calcium methacrylate), and (meth)acrylamides (e.g. acrylamide, N-methylolacrylamide, and methacrylamide). These monomers may be used in combination of two or more of them.

The above-mentioned monofunctional monomer is copolymerized with a polyfunctional monomer having two or more non-conjugated reactive double bonds per molecule, and as a result, a crosslinked polymer (rubber) is obtained. Examples of the polyfunctional monomer used here include allyl methacrylate, allyl acrylate, triallyl cyanurate, triallyl isocyanurate, diallyl phthalate, diallyl maleate, divinyl adipate, divinylbenzene ethylene glycol dimethacrylate, divinylbenzene ethylene glycol diacrylate, diethylene glycol dimethacrylate, diethylene glycol diacrylate, triethylene glycol dimethacrylate, triethylene glycol diacrylate, trimethylol propane trimethacrylate, trimethylol propane triacrylate, tetramethylol methane tetramethacrylate, tetramethylol methane tetraacrylate, dipropylene glycol dimethacrylate, and dipropylene glycol diacrylate. These polyfunctional monomers may be used in combination of two or more of them.

The amount of the polyfunctional monomer to be added to the monofunctional monomers is preferably 0.05 to 10 parts by weight, more preferably 0.1 to 5 parts by weight with respect to 100 parts by weight of the total amount of the monofunctional monomers. If the amount of the polyfunctional monomer to be added is less than 0.05 part by weight, formation of a crosslinked polymer tends to be impossible. On the other hand, if the amount of the polyfunctional monomer to be added exceeds 10 parts by weight, the film tends to have low crack resistance.

The vinyl-based polymer (A) may have at least one crosslinked structure layer, and may have one crosslinked structure layer consisting of polymer particles or may have two or more crosslinked structure layers consisting of two or more layers of particles obtained by multistage polymerization. However, for the development of the non-birefringence, it is preferable that at least a crosslinked layer is present as the outermost layer of the vinyl-based polymer (A).

<Polymerization of Vinyl-Based Monomer Mixture (B)>

The graft copolymer (C) of the present invention is obtained by polymerizing the vinyl-based monomer mixture (B) in the presence of the vinyl-based polymer (A) described above. An island domain consisting of the vinyl-based polymer (A) is uniformly and easily dispersed in the matrix by covalently bonding (grafting) a polymer of the vinyl-based monomer mixture (B) to the vinyl-based polymer (A) having a crosslinked structure.

In the present invention, the polymer of the vinyl-based monomer mixture (B) is preferably a "hard" polymer. The term "hard" as used herein means that the glass transition temperature of the polymer is 20° C. or higher, preferably 30° C. or higher, more preferably 40° C. or higher, even more preferably 60° C. or higher, most preferably 70° C. or higher. When the graft copolymer (C) synthesized by polymerization is recovered as a powder, coarsening and agglomeration hardly occur. In addition, the heat resistance of the optical resin material and the molded body (film or the like) of the present invention is good. Furthermore, the polymer of the vinyl-based monomer mixture (B) is preferably a non-crosslinked hard polymer from the viewpoint of optical isotropy.

The effect to allow the molded body made of the optical resin material of the present invention, particularly the optical film, to have extremely small birefringence is mainly developed by the polymer obtained by polymerizing the vinyl-based monomer mixture (B). In the graft copolymer (C) obtained by polymerizing the vinyl-based monomer mixture (B) in the presence of the vinyl-based polymer (A) having at least one crosslinked structure layer, it is possible to design the birefringence of one or both of the polymers to be small by adjustment of the composition of the polymer, without limitation to either one of the vinyl-based polymer (A) and the polymer of the vinyl-based monomer mixture (B).

The vinyl-based polymer (A) having a crosslinked structure is hardly deformed by external force by the presence of a crosslinked structure. In the polymer (A), the orientation of the polymer chains is unlikely to occur and the development of birefringence is suppressed. In addition, when setting the crosslinking density of the vinyl-based polymer (A) having a crosslinked structure to a low value, the polymer is easily deformed by external force, and orientation of the polymer chains tends to occur. Therefore, it is preferable to design the birefringence of the vinyl-based polymer (A) having a crosslinked structure to be small.

In the polymer of the vinyl-based monomer mixture (B), at the time of molding or stress application, the polymer chain is more easily oriented in the stress direction than the vinyl-based polymer (A) having a crosslinked structure, and the polymer of the vinyl-based monomer mixture (B) tends to easily develop birefringence. Therefore, it is particularly preferred to design the birefringence of the polymer of the vinyl-based monomer mixture (B) to be small.

More preferably, it is effective to design a layer made from the polymer of the vinyl-based monomer mixture (B) to be positioned as an outer layer of the graft copolymer (C), so that the layer easily interacts with the matrix.

When the degree of orientation of a polymer in the molded body is not so large and therefore the orientation birefringence does not cause a problem in its practical use, such as when the molded body is not subjected to a stretching process, the composition of the polymer is preferably adjusted to make the photoelastic constant of the polymer of the vinyl-based monomer mixture (B) small, so that the molded body has a very small photoelastic constant. On the other hand, when the degree of orientation of a polymer in the molded body, such as a film is large and therefore the orientation birefringence of the molded body causes a problem in its practical use, such as when the molded body is subjected to a stretching process, the composition of the polymer is preferably adjusted so that the molded body has a small photoelastic constant and a small orientation birefringence.

Specifically, the composition of the vinyl-based monomer mixture (B) is preferably adjusted in such a manner that the orientation birefringence of a homopolymer obtained by homopolymerization of the vinyl-based monomer mixture (B) is $-15 \times 10^{-4}$ to $15 \times 10^{-4}$ and the photoelastic constant of the homopolymer is $-10 \times 10^{-12}$ to $10 \times 10^{-12}$ $Pa^{-1}$. The orientation birefringence is more preferably $-10 \times 10^{-4}$ to $10 \times 10^{-4}$, even more preferably $-5 \times 10^{-4}$ to $5 \times 10^{-4}$, still more preferably $-1 \times 10^{-4}$ to $1 \times 10^{-4}$, particularly preferably $-0.5 \times 10^{-4}$ to $0.5 \times 10^{-4}$, most preferably $-0.2 \times 10^{-4}$ to $0.2 \times 10^{-4}$. In addition, the photoelastic constant is more preferably $-4 \times 10^{-12}$ to $4 \times 10^{-12}$, even more preferably $-2 \times 10^{-12}$ to $2 \times 10^{-12}$, still more preferably $-1 \times 10^{-12}$ to $1 \times 10^{-12}$, particularly preferably $-0.5 \times 10^{-12}$ to $0.5 \times 10^{-12}$, most preferably $-0.3 \times 10^{-12}$ to $0.3 \times 10^{-12}$.

As an example, a polymer of the vinyl-based monomer mixture (B) which is highly effective for increasing the optical isotropy of the optical resin material and the optical film of the present invention and is positioned on the outer layer of the graft copolymer (C) will be described below.

For the monomer species suitable for reducing the photoelastic birefringence of a homopolymer itself of the vinyl-based polymer mixture (B), monomer species that are opposite in sign of a photoelastic constant to each other may be used in combination.

Specific examples of a monomer are given below as a reference for setting the photoelastic constant of a polymer, but the monomer species are not limited thereto (a value in the parenthesis [ ] represents the photoelastic constant of its homopolymer).

Monomers showing positive photoelastic birefringence:
Benzyl methacrylate [$48.4 \times 10^{-12}$ $Pa^{-1}$]
Dicyclopentanyl methacrylate [$6.7 \times 10^{-12}$ $Pa^{-1}$]
Styrene [$10.1 \times 10^{-12}$ $Pa^{-1}$]
p-Chlorostyrene [$29.0 \times 10^{-12}$ $Pa^{-1}$]
Monomers showing negative photoelastic birefringence:
Methyl methacrylate [$-4.3 \times 10^{-12}$ $Pa^{-1}$]
2,2,2-Trifluoroethyl methacrylate [$-1.7 \times 10^{-12}$ $Pa^{-1}$]
2,2,2-Trichloroethyl methacrylate [$-10.2 \times 10^{-12}$ $Pa^{-1}$]

Isobornyl methacrylate [−5.8×10⁻¹² Pa⁻¹]

It is known that additivity is established between the photoelastic constant of a copolymer and the photoelastic constants of homopolymers corresponding to monomer species used for copolymerization. For example, it has been reported that in the case of a binary copolymerization system of methyl methacrylate (MMA) and benzyl methacrylate (BzMA), its photoelastic birefringence is substantially zero when the ratio of poly-MMA/BzMA is 92/8 (wt %). The same applies to a mixture (alloy) of two or more polymers, that is, additivity is established between the photoelastic constant of a polymer mixture and the photoelastic constant of each polymer. From the above, it is necessary to reduce the photoelastic constant of the polymer of the vinyl-based monomer mixture (B) and adjust the amount thereof (wt %) so that the photoelastic birefringence of the optical resin material and the optical film of the present invention is reduced.

Further, it is known that additivity is established between the orientation birefringence of a copolymer and the intrinsic birefringence of each homopolymer corresponding to monomer species used for copolymerization. The same applies to a mixture (alloy) of two or more polymers, that is, additivity is established between the orientation birefringence of a polymer mixture and the intrinsic birefringence of each polymer. For the monomer species suitable for reducing the orientation birefringence of a polymer itself of the vinyl-based monomer mixture (B), they may be used in combination in such a manner that the orientation birefringences are opposite in sign to each other.

Specific examples of a monomer are given below as a reference for setting the orientation birefringence of a polymer (a value in the parenthesis [ ] represents the intrinsic birefringence of a homopolymer consisting of the monomer), but the monomer species are not limited thereto. It is to be noted that the term "intrinsic birefringence" refers to birefringence (orientation birefringence) when a polymer is completely oriented in one direction.

Polymers showing positive intrinsic birefringence:
Poly(benzyl methacrylate) [+0.002]
Polyphenylene oxide [+0.210]
Bisphenol A polycarbonate [+0.106]
Polyvinyl chloride [+0.027]
Polyethylene terephthalate [+0.105]
Polyethylene [+0.044]
Polymers showing negative intrinsic birefringence:
Poly(methyl methacrylate) [−0.0043]
Polystyrene [−0.100]

Although the data of photoelastic constants and orientation birefringences of some polymers are shown above, both the birefringences are not always the same in sign depending on the type of polymer. That is, some polymers have a "positive" orientation birefringence and a "negative" photoelastic constant. The signs of the orientation birefringence and photoelastic birefringence (constant) of some homopolymers are shown in the following Table 1 as examples.

TABLE 1

| Homopolymer | Sign of orientation birefringence | Sign of photoelastic constant |
| --- | --- | --- |
| Poly(methyl methacrylate) (MMA) | Negative | Negative |
| Poly(2,2,2-trifluoroethyl methacrylate) (3FMA) | Positive | Negative |
| Poly(benzyl methacrylate) (BzMA) | Positive | Positive |

For example, it is known that the orientation birefringence of a poly(MMA/BzMA) copolymer having a composition of around 82/18 (wt %) is substantially zero and that the photoelastic birefringence (constant) of a poly(MMA/BzMA) copolymer having a composition of around 92/8 (wt %) is substantially zero.

Poly (MMA/3FMA/BzMA=55.5/38.0/6.5) described in Japanese Patent No. 4624845 can be mentioned as a suitable example of a polymer composition to extremely reduce both photoelastic birefringence and orientation birefringence to a small value, and ideally to substantially zero. However, since the polymer composition is composed only of methacrylate monomers, zipper depolymerization occurs at high temperature molding, thereby not only reducing the molecular weight and mechanical strength, but also causing problems of coloring, foaming, or the like. As a solution to these problems, copolymerization with a small amount of an acrylate can suppress excessive decomposition due to zipper depolymerization during high temperature molding.

There is no particular limitation with respect to the composition of the vinyl-based monomer mixture (B). Above all, examples of the monomer which may be particularly suitably used include methacrylates (e.g. methyl methacrylate, ethyl methacrylate, butyl methacrylate, cyclohexyl methacrylate, benzyl methacrylate, glycidyl methacrylate, epoxycyclohexylmethyl methacrylate, 2-hydroxyethyl methacrylate, 2-hydroxypropyl methacrylate, dicyclopentanyl methacrylate, dicyclopentenyloxyethyl methacrylate, 2,2,2-trifluoroethyl methacrylate, 2,2,2-trichloroethyl methacrylate, isobornyl methacrylate, phenyl methacrylate, phenoxyethyl methacrylate, pentamethylpiperidinyl methacrylate, tetramethylpiperidinyl methacrylate, and tetrahydrofurfuryl methacrylate); acrylates (e.g. methyl acrylate, ethyl acrylate, butyl acrylate, 2-ethylhexyl acrylate, glycidyl acrylate, epoxycyclohexylmethyl acrylate, benzyl acrylate, 2-hydroxyethyl acrylate, 2-hydroxypropyl acrylate, dicyclopentanyl acrylate, dicyclopentenyloxyethyl acrylate, phenyl acrylate, phenoxyethyl acrylate, pentamethylpiperidinyl acrylate, tetramethylpiperidinyl acrylate, and tetrahydrofurfuryl acrylate); carboxylic acids and esters thereof (e.g. methacrylic acid and acrylic acid); unsubstituted and/or substituted maleic anhydrides (e.g. maleic anhydride, citraconic anhydride, dimethylmaleic anhydride, dichloromaleic anhydride, bromomaleic anhydride, dibromomaleic anhydride, phenylmaleic anhydride, and diphenylmaleic anhydride); (hydroxyalkyl)acrylates (e.g. methyl 2-(hydroxymethyl)acrylate, ethyl 2-(hydroxymethyl) acrylate, isopropyl 2-(hydroxymethyl)acrylate, n-butyl 2-(hydroxymethyl)acrylate, and t-butyl 2-(hydroxymethyl)acrylate); vinyl cyanides (e.g. acrylonitrile and methacrylonitrile); vinyl arenes (e.g. styrene, α-methylstyrene, monochlorostyrene, and dichlorostyrene); maleic acid, fumaric acid, and esters thereof; vinyl halides (e.g. vinyl chloride, vinyl bromide, and chloroprene): vinyl acetate; alkenes (e.g. ethylene, propylene, butylene, butadiene, and isobutylene); halogenated alkenes; and polyfunctional monomers (e.g. allyl methacrylate, diallyl phthalate, triallyl cyanurate, monoethyleneglycol dimethacrylate, tetraethyleneglycol dimethacrylate, tetraethyleneglycol dimethacrylate, and divinyl benzene). These vinyl-based monomers may be used singly or in combination of two or more of them. Particularly from the viewpoint of the birefringence control, it is preferable to use a polyfunctional monomer to the extent that the polymer chains can be oriented against stress, but it is particularly preferable not to use the polyfunctional monomer.

Of the above monomers, from the viewpoint of reducing the birefringence, a vinyl-based monomer having a ring structure such as an alicyclic structure, a heterocyclic structure, or an aromatic group in the molecular structure is preferable, and it is more preferable that the vinyl-based monomer mixture (B) contains a vinyl-based monomer having an alicyclic structure, a heterocyclic structure, or an aromatic group. Specific examples of the vinyl-based monomer having an alicyclic structure, a heterocyclic structure, or an aromatic group include a monomer having an alicyclic structure, such as dicyclopentanyl (meth)acrylate and dicyclopentenyloxyethyl (meth)acrylate. In addition, examples of the monomer having an aromatic group include vinyl arenes (e.g. styrene, α-methylstyrene, monochlorostyrene, and dichlorostyrene), benzyl (meth)acrylate, phenyl (meth)acrylate, and phenoxyethyl (meth)acrylate. Examples of the monomer having a heterocyclic structure include pentamethylpiperidinyl (meth)acrylate, tetramethylpiperidinyl (meth)acrylate, and tetrahydrofurfuryl (meth)acrylate. In the vinyl-based monomer having an alicyclic structure, the ring structure is preferably a polycyclic structure, and more preferably a fused ring structure. The vinyl-based monomer having an alicyclic structure, a heterocyclic structure, or an aromatic group is preferably a monomer represented by the following formula (4):

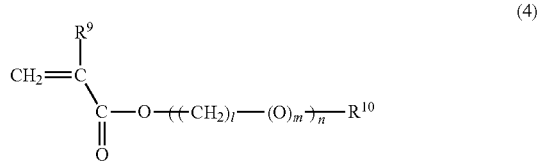

(4)

wherein $R^9$ is a hydrogen atom or a substituted or unsubstituted linear or branched alkyl group having 1 to 12 carbon atoms; and $R^{10}$ is a substituted or unsubstituted aromatic group having 1 to 24 carbon atoms, or a substituted or unsubstituted alicyclic group having 1 to 24 carbon atoms, and has a monocyclic structure or a heterocyclic structure. The substituent optionally possessed by $R^9$ and $R^{10}$ is, for example, at least one member selected from the group consisting of a halogen, a hydroxyl group, a carboxyl group, an alkoxy group, a carbonyl group (ketone structure), an amino group, an amide group, an epoxy group, a carbon-carbon double bond, an ester group (derivative of carboxyl group), a mercapto group, a sulfonyl group, a sulfone group, and a nitro group. Among them, at least one member selected from the group consisting of a halogen, a hydroxyl group, a carboxyl group, an alkoxy group, and a nitro group is preferred. In the formula (4), l is an integer of 1 to 4, preferably 0 or 1, m is an integer of 0 to 1, and n is an integer of 0 to 10, preferably 0 to 2, more preferably 0 or 1.

Above all, the vinyl-based monomer having an alicyclic structure, a heterocyclic structure, or an aromatic group is preferably a (meth)acrylic monomer having an alicyclic structure, a heterocyclic structure, or an aromatic group. Specifically, in the formula (4), a (meth)acrylate monomer in which $R^9$ is a hydrogen atom or a substituted or unsubstituted linear or branched alkyl group having 1 carbon atom is preferable. In the formula (4), a (meth)acrylate monomer in which $R^{10}$ is a substituted or unsubstituted aromatic group having 1 to 24 carbon atoms, or a substituted or unsubstituted alicyclic group having 1 to 24 carbon atoms and has a monocyclic structure is more preferable. Further, in the formula (4), a (meth)acrylate monomer in which l is an integer of 1 to 2 and n is an integer of 0 to 2 is preferable.

Among (meth)acrylate monomers represented by the formula (4), benzyl (meth)acrylate, dicyclopentanyl (meth)acrylate, and phenoxyethyl (meth)acrylate are preferred In addition, the monomer represented by the formula (4) is preferably contained in an amount of 1 to 99 wt %, more preferably 1 to 70 wt %, even more preferably 1 to 50 wt %, with respect to 100 wt % of the vinyl-based monomer mixture (B).

The vinyl-based monomer mixture (B) may be polymerized in one stage by mixing all the components. If a molded body made from a polymer obtained by homopolymerizing the vinyl-based monomer mixture (B) is sufficiently non-birefringent to meet the requirement of the present invention, the vinyl-based monomer mixture (B) may be polymerized in two or more stages by changing the composition of the monomer.

The glass transition temperature of the graft copolymer (C) used in the present invention can be set according to use conditions and intended use, but is preferably 80° C. or higher, more preferably 90° C. or higher, even more preferably 100° C. or higher, still more preferably 110° C. or higher, most preferably 120° C. or higher.

In the graft copolymer (C) of the present invention, the orientation birefringence satisfies $-15 \times 10^{-4}$ to $15 \times 10^{-4}$ and the photoelastic constant satisfies $-10 \times 10^{-12}$ to $10 \times 10^{-12}$. The orientation birefringence is preferably $-10 \times 10^{-4}$ to $10 \times 10^{-4}$, more preferably $-5 \times 10^{-4}$ to $5 \times 10^{-4}$, even more preferably $-1.6 \times 10^{-4}$ to $1.6 \times 10^{-4}$, still more preferably $-1 \times 10^{-4}$ to $1 \times 10^{-4}$, particularly preferably $-0.5 \times 10^{-4}$ to $0.5 \times 10^{-4}$, most preferably $-0.2 \times 10^{-4}$ to $0.2 \times 10^{-4}$. Further, the photoelastic constant is preferably $-4 \times 10^{-12}$ to $4 \times 10^{-12}$, more preferably $-2 \times 10^{-12}$ to $2 \times 10^{-12}$, even more preferably $-1 \times 10^{-12}$ to $1 \times 10^{-2}$, still more preferably $-0.5 \times 10^{-12}$ to $0.5 \times 10^{-12}$, most preferably $-0.3 \times 10^{-12}$ to $0.3 \times 10^{-12}$.

The graft copolymer (C) is not particularly limited as long as it has, in the multilayer structure, a crosslinked polymer layer of the vinyl-based polymer (A) and a polymer layer of the vinyl-based monomer mixture (B). The outermost layer of the graft copolymer (C) is preferably hard, and the outermost layer is more preferably non-birefringent and is particularly preferably non-crosslinked. By having a hard outermost layer, such a layer easily functions as a matrix component (sea), and the polymer chains are easily oriented against stress because of its non-crosslinked structure, thereby making it possible to maximize its non-birefringent property and to further reduce the orientation birefringence and photoelastic constant. For this reason, it becomes more easy to obtain a film excellent in optical isotropy. Here, in the case of a "non-birefringent" (polymer) layer, the term "non-birefringent" means that the orientation birefringence and the photoelastic birefringence are both low. Specifically, the orientation birefringence preferably satisfies $-15 \times 10^{-4}$ to $15 \times 10^{-4}$ and the photoelastic constant preferably satisfies $-10 \times 10^{-12}$ to $10 \times 10^{-12}$.

In addition, the ratio of the vinyl-based polymer (A) to the vinyl-based monomer mixture (B) on a weight basis is preferably 5:95 to 95:5, more preferably 10:90 to 90:10, even more preferably 20:80 to 80:30, still more preferably 25:75 to 75:25, most preferably 30:70 to 70:30. When the amount of the vinyl-based polymer (A) is less than 5%, sufficient mechanical strength may not be achieved. Alternatively, when the amount of the vinyl-based polymer (A) is greater than 95%, a good molded body as well as sufficient non-birefringence is not obtained because the melt temperature during molding becomes higher, and grain-coarsening and agglomeration at the time of pulverization of the graft copolymer (C) may occur to deteriorate the productivity.

Part of the vinyl-based monomer mixture (B) is covalently bound to the vinyl-based polymer (A) to form a multilayer structure polymer. The ratio of the vinyl-based monomer mixture (B) covalently bound to the vinyl-based polymer (A) can be represented by the graft ratio.

The graft ratio of the graft copolymer (C) is an index representing the weight ratio of the vinyl-based monomer mixture (B) grafted to the vinyl-based polymer (A) when the weight of the vinyl-based polymer (A) is defined as 100. The graft ratio is preferably 10 to 250%, more preferably 40 to 230%, most preferably 60 to 220%. If the graft ratio is less than 10%, the graft copolymer (C) is likely to aggregate when another non-crosslinked and non-birefringent resin is added to the graft copolymer (C), so that there is a case where transparency is impaired or defects are caused by foreign substances. Further, the tensile elongation at break of the film is reduced so that cracks are likely to occur when the film is cut. On the other hand, if the graft ratio exceeds 250%, the melt viscosity during molding, for example, during film formation increases to result in a tendency to deteriorate film formability. The calculation formula of the graft ratio will be described later in the section of Examples.

Part of the vinyl-based monomer mixture (B) are sometimes present as a polymer which is not bound (not grafted) to the vinyl-based polymer (A) (also referred to as free polymer). The graft copolymer (C) of the present invention shall also contain the free polymer.

The graft copolymer (C) may be a multilayer structure polymer having a crosslinked polymer layer of the vinyl-based polymer (A) and a polymer layer of the vinyl-based monomer mixture (B). The polymer layer of the vinyl-based monomer mixture (B) is preferably a hard polymer layer, and more preferably has a non-crosslinked structure. A preferred example of a form of such a graft copolymer (C) is one that has a soft inner layer having a (meth)acrylic crosslinked polymer layer and a hard outer layer having a non-birefringent hard polymer layer. This form is preferred from the viewpoint of productivity. Another preferred example of a form of the graft copolymer (C) is one that has a hard inner layer composed of at least one hard polymer layer, a soft intermediate layer having a (meth)acrylic crosslinked polymer layer, and a hard outer layer having a non-birefringent polymer layer, and this form may further have a soft innermost layer. In the present invention, one or more kinds of such layers can be appropriately used singly or in combination thereof.

In the present application, the terms "soft inner layer," "soft intermediate layer," and "soft innermost layer" (hereinafter, referred to as "soft layers") refer to an inner layer, an intermediate layer, and an innermost layer composed of at least one kind of soft polymer, respectively.

On the other hand, in the present application, the terms "hard outer(most) layer" and "hard inner layer" refer to an outer(most) layer and an inner layer composed of at least one kind of hard polymer, respectively.

When the graft copolymer (C) has a hard layer as an innermost layer, for example, when the graft copolymer (C) has a multilayer structure composed of a hard inner layer, a soft intermediate layer, and a hard outer layer, the innermost layer is preferably made of, for example, a hard polymer composed of 40 to 100 wt % of a methacrylate, 0 to 60 wt % of an acrylate, 0 to 60 wt % of an aromatic vinyl monomer, 0 to 10 wt % of a polyfunctional monomer, and 0 to 20 wt % of a vinyl monomer copolymerizable with the methacrylate, the acrylate, and the aromatic vinyl monomer from the viewpoint of a balance between hardness and crack resistance.

When the graft copolymer (C) has a multilayer structure composed of, for example, a soft inner layer having a (meth)acrylic crosslinked polymer layer and a hard outer layer, a layer structure, in which the soft inner layer is completely covered with the outer hard polymer layer, is generally formed. However, depending on, for example, the weight ratio between the soft inner layer and the hard outer layer, there is a case where the amount of the hard polymer is not sufficient for forming such a layer structure. In such a case, the layer structure does not always need to be complete, and a structure in which part of the soft inner layer is covered with the hard polymer as an outer part or a structure in which the hard polymer as an outer part is graft-polymerized with part of the soft inner layer may also be suitably used. It is to be noted that the same applies to other forms of the multilayer structure.

The volume average particle diameter to the crosslinked polymer layer of the graft copolymer (C) is preferably 20 to 450 nm, more preferably 20 to 300 nm, even more preferably 20 to 150 nm, most preferably 30 to 80 nm. If the volume average particle diameter is less than 20 nm, there is a case where crack resistance is deteriorated. On the other hand, if the volume average particle diameter exceeds 450 nm, there is a case where transparency is deteriorated. Further, from the viewpoint of resistance to whitening on bending, the volume average particle diameter is preferably less than 80 nm. In addition, from the viewpoint of trimming property, the volume average particle diameter is preferably 20 to 450 nm, more preferably 50 to 450 nm, even more preferably 60 to 450 nm, still more preferably 100 to 450 nm. It is to be noted that the volume average particle diameter can be measured by a dynamic scattering method using, for example, MICROTRAC UPA150 (manufactured by NIKKISO CO., LTD.). Here, the volume average particle diameter to the crosslinked polymer layer of the graft copolymer (C) specifically refers to a volume average particle diameter of particles from the center of the graft copolymer (C) particles to the crosslinked polymer layer. When the graft copolymer (C) has two or more crosslinked polymer layers, the average volume particle diameter to the crosslinked polymer layer of the graft copolymer (C) refers to a volume average particle diameter to the crosslinked polymer layer positioned at the outermost side from the center of the graft copolymer (C) particles.

The crosslinked polymer content of the graft copolymer (C) is preferably 10 to 90 wt %, more preferably 20 to 80 wt %, even more preferably 30 to 60 wt %, most preferably 35 to 55 wt % when the amount of the graft copolymer (C) is taken as 100 wt %. If the crosslinked polymer content is less than 10 wt %, there is a case where an optical resin material has low mechanical strength such as crack resistance. On the other hand, if the crosslinked polymer content exceeds 90 wt %, the dispersibility of the graft copolymer (C) is impaired and a resulting molded body cannot have a smooth surface, which tends to cause appearance defects such as fish eyes. Further, the content of the vinyl-based monomer mixture (B) is not sufficient, which tends to increase orientation birefringence or photoelastic constant so that optical isotropy cannot be maintained.

The graft copolymer (C) may be any one which is obtained by multistage polymerization, and a (meth)acrylic rubber-containing graft copolymer obtained by multistage polymerization can be preferably used, in which at least one stage of the multistage polymerization is polymerization of a vinyl-based monomer mixture (B) to be a non-birefringent polymer composition in the presence of (meth)acrylic rubber-containing polymer particles.

The (meth)acrylic rubber-containing polymer particles shall be polymer particles obtained by multistage polymerization and containing at least a (meth)acrylic rubber. The (meth)acrylic rubber-containing polymer particles preferably have a rubber ((meth)acrylic crosslinked polymer) part obtained by polymerization of 50 to 100 wt % of an alkyl acrylate, 50 to 0 wt % of a vinyl monomer copolymerizable with the alkyl acrylate, and 0.05 to 10 parts by weight of a polyfunctional monomer (with respect to 100 parts by weight of the total amount of the alkyl acrylate and the vinyl monomer copolymerizable therewith). The rubber part may be obtained by one stage polymerization performed by mixing all the monomer components or by polymerization performed in two or more stages by changing the composition of monomers.

The (meth)acrylic rubber-containing polymer particles are not particularly limited as long as a (meth)acrylic crosslinked polymer (rubber part) is formed in at least one of the stages of multistage polymerization, and polymerization for forming a hard polymer may be performed before and/or after the stage of polymerization for forming a (meth)acrylic crosslinked polymer.

Particularly, from the viewpoint of productivity, the graft copolymer (C) to be used is preferably a (meth)acrylic rubber-containing graft copolymer obtained by:

(c-1) polymerization of a monomer mixture containing 50 to 100 wt % of an alkyl acrylate, 50 to 0 wt % of a monomer copolymerizable therewith, and 0.05 to 10 parts by weight of a polyfunctional monomer (with respect to 100 parts by weight of the total amount of the alkyl acrylate and the monomer copolymerizable therewith) to give (meth)acrylic rubber-containing polymer particles, and (c-2) polymerization of a vinyl-based monomer mixture (B) to be a non-birefringent polymer composition in the presence of the (meth)acrylic rubber-containing polymer particles to give a (meth)acrylic rubber-containing graft copolymer.

Here, the polymerization of the monomer mixture in the polymerization stage (c-1) and/or the polymerization of the vinyl-based monomer mixture (B) in the polymerization stage (c-2) may be performed in one stage by mixing all the monomer components or in two or more stages by changing the composition of monomers. Further, examples of the alkyl acrylate, the monomer copolymerizable therewith, and the polyfunctional monomer, and preferred amounts thereof to be used in the stage (c-1) are the same as those described above with reference to the (meth)acrylic crosslinked polymer.

The method for producing the graft copolymer (C) is not particularly limited, and it is possible to use known methods such as an emulsion polymerization method, an emulsion-suspension polymerization method, a suspension polymerization method, a bulk polymerization method, or a solution polymerization method. The graft copolymer (C) is particularly preferably produced by an emulsion polymerization method.

When the graft copolymer (C) is produced by emulsion polymerization, the emulsion polymerization can be performed by a conventional method using a known emulsifying agent. Specific examples of the emulsifying agent include anionic surfactants such as sodium alkyl sulfonate, sodium alkylbenzene sulfonate, sodium dioctylsulfosuccinate, sodium lauryl sulfate, fatty acid sodium, and phosphate salts such as sodium polyoxyethylene lauryl ether phosphate and non-ionic surfactants such as reaction products of alkyl phenols or aliphatic alcohols with propylene oxide or ethylene oxide. These surfactants may be used singly or in combination of two or more of them. Further, if necessary, a cationic surfactant such as an alkylamine salt may be used. Among them, a phosphate salt (an alkali metal salt or an alkaline earth metal salt) such as sodium polyoxyethylene lauryl ether phosphate is particularly preferably used for polymerization from the viewpoint of improving the heat stability of a resulting graft copolymer (C).

A multilayer structure polymer latex obtained by emulsion polymerization is subjected to known treatment such as spray drying, freeze drying, or treatment in which a coagulant such as a salt (e.g., calcium chloride or magnesium chloride) or an acid (e.g., hydrochloric acid or sulfuric acid) is added to coagulate a resin component and the resin component is separated from an aqueous phase by, if necessary, performing heat treatment or the like, washed, and dried, to give a powdered multilayer structure polymer. When the polymer latex is coagulated to give a multilayer structure polymer, a known coagulant such as an acid or a salt can be used, but a magnesium salt, especially magnesium sulfate, is particularly preferably used as a coagulant from the viewpoint of improving heat stability during molding of a resulting copolymer.

In the optical resin material of the present invention, a resin having transparency may be added as long as the effects of the invention are not impaired. Specifically, preferred examples include a wide variety of transparent thermoplastic resins, such as polycarbonate resins typified by bisphenol A polycarbonate; aromatic vinyl resins and hydrogenated products thereof, such as polystyrene, styrene-acrylonitrile copolymers, styrene-maleic anhydride resins, styrene-maleimide resins, styrene-(meth)acrylic acid resins, and styrene-based thermoplastic elastomers; polyolefin-based resins such as amorphous polyolefins, transparent polyolefins with a microcrystalline phase, and ethylene-methyl methacrylate resins; acrylic resins such as poly (methyl methacrylate) and styrene-methyl methacrylate resins and heat-resistant acrylic resins obtained by modifying the acrylic resins by, for example, imide cyclization, lactone cyclization, or denaturation with methacrylic acid; amorphous polyester resins or transparent polyester resins with a microcrystalline phase, such as polyethylene terephthalate or polyethylene terephthalate partially denatured with a cyclohexanedimethylene group or isophthalic acid, polyethylene naphthalate, and polyarylate; polyimide resins; polyether sulfone resins; polyamide resins; cellulose-based resins, such as triacetylcellulose resins; and polyphenylene oxide resins. In consideration of practical use, the resin is preferably selected so that a resulting molded body has a total light transmittance of 85% or more, preferably 90% or more, more preferably 92% or more.

Among these resins, acrylic resins are particularly preferred for their excellent optical characteristics, heat resistance, and molding processability. Any acrylic resin may be used as long as it is a resin obtained by polymerization of a vinyl-polymerizable monomer containing an alkyl (meth) acrylate, but an acrylic resin obtained by polymerization of 30 to 100 wt % of methyl methacrylate and 70 to 0 wt % of a monomer copolymerizable therewith is preferred.

A preferred example of other vinyl monomers copolymerizable with methyl methacrylate is a (meth)acrylate (except for methyl methacrylate) whose alkyl residue has 1 to 10 carbon atoms. Specific examples of such other vinyl monomers copolymerizable with methyl methacrylate include: methacrylates such as ethyl methacrylate, butyl methacrylate, cyclohexyl methacrylate, benzyl methacrylate, glycidyl methacrylate, epoxycyclohexylmethyl methacrylate, 2-hydroxyethyl methacrylate, 2-hydroxypropyl methacrylate, dicyclopentanyl methacrylate, 2,2,2-trifluoroethyl methacrylate, 2,2,2-trichloroethyl methacrylate, and isobornyl methacrylate; acrylates such as methyl acrylate, ethyl acrylate, butyl acrylate, 2-ethylhexyl acrylate, glycidyl acrylate, epoxycyclohexylmethyl acrylate, 2-hydroxyethyl acrylate, and 2-hydroxypropyl acrylate; carboxylic acids such as methacrylic acid and acrylic acid, and esters thereof; vinyl cyanides such as acrylonitrile and methacrylonitrile; vinyl arenes such as styrene, α-methylstyrene, monochlorostyrene, and dichlorostyrene; maleic acid, fumaric acid and esters thereof; vinyl halides such as vinyl chloride, vinyl bromide, and chloroprene; vinyl acetate; alkenes such as ethylene, propylene, butylene, butadiene, and isobutylene; halogenated alkenes; and polyfunctional monomers such as allyl methacrylate, diallyl phthalate, triallyl cyanurate, monoethyleneglycol dimethacrylate, tetraethyleneglycol dimethacrylate, tetraethyleneglycol dimethacrylate, and divinyl benzene. These vinyl monomers may be used singly or in combination of two or more of them.

The methyl methacrylate polymer contains 30 to 100 wt %, preferably 50 to 99.9 wt %, more preferably 50 to 98 wt % of methyl methacrylate and 70 to 0 wt %, preferably 50 to 0.1 wt %, more preferably 50 to 2 wt % of a monomer copolymerizable with methyl methacrylate. If the methyl methacrylate content is less than 30 wt %, optical characteristics, appearance, weather resistance, and heat resistance specific to (meth)acrylic resins tend to be deteriorated. From the viewpoint of processability and appearance, it is preferred that a polyfunctional monomer is not used.

The glass transition temperature of the resin can be set according to use conditions and intended use, but is preferably 100° C. or higher, more preferably 110° C. or higher, even more preferably 115° C. or higher, most preferably 120° C. or higher.

A specific example of an acrylic resin having a glass transition temperature of 120° C. or higher is an acrylic resin containing a glutarimide structure, a glutaric anhydride structure, a (meth)acrylic acid unit, or a lactone structure in its molecule. Examples of such an acrylic resin include polyglutarimide acrylic resins, glutaric anhydride acrylic resins, lactone-cyclized acrylic resins, and methacrylic resins. Further, examples of the resin having a glass transition temperature of 120° C. or higher include partially-hydrogenated styrene-based polymers obtained by partial hydrogenation of aromatic rings of a styrene-based polymer obtained by polymerization of a styrene monomer and another monomer copolymerizable therewith; polymers containing a cyclic acid anhydride repeating unit; polyethylene terephthalate resins; and polybutylene terephthalate resins.

A non-birefringent resin (D) which is small in photoelastic birefringence and orientation birefringence is preferable as a resin to be blended with the optical resin material of the present invention because a non-birefringent graft copolymer (C) is used in the optical resin material. Specifically, non-birefringent polymers described in Examples of Japanese Patent No. 4624845 can be mentioned. Moreover, the non-birefringent resin (D) needs not to be a resin having the same composition as that of the vinyl-based monomer mixture (B) of the present invention, and is not particularly limited as long as it satisfies the range of the photoelastic birefringence and orientation birefringence suitable for a molded body, particularly an optical film, made of a molding resin material together with the graft copolymer (C). The orientation birefringence of the resin (D) is preferably $-15\times10^{-4}$ to $15\times10^{-4}$, and the photoelastic constant of the resin (D) is preferably $-10\times10^{-12}$ to $10\times10^{-12}$ $Pa^{-1}$. The polymer composition of the resin (D) may be adjusted by combining the monomer species suitable for reducing the photoelastic birefringence and orientation birefringence described above. Above all, a polymer obtained by homopolymerization of the vinyl-based monomer mixture (B) is preferable in terms of compatibility with the graft copolymer (C). Moreover, the non-birefringent resin (D) may be composed of one or more resins.

A glutarimide acrylic resin is usable as the non-birefringent resin (D), because the resulting film is improved in heat resistance and also excellent in optical characteristics during stretching. In the following, the glutarimide acrylic resin will be described.

(Glutarimide Acrylic Resin)

The glutarimide acrylic resin has a glass transition temperature of 120° C. or higher and contains a unit represented by the following general formula (1) and a unit represented by the following general formula (2).

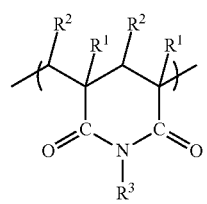

(1)

In the general formula (1), $R^1$ and $R^2$ are each independently hydrogen or an alkyl group having 1 to 8 carbon atoms, and $R^3$ is hydrogen, an alkyl group having 1 to 18 carbon atoms, a cycloalkyl group having 3 to 12 carbon atoms, or an aromatic ring-containing substituent having 5 to 15 carbon atoms. Hereinafter, the unit represented by the general formula (1) is also referred to as "glutarimide unit."

In the general formula (1), $R^1$ and $R^2$ are preferably each independently hydrogen or a methyl group; $R^3$ is preferably hydrogen, a methyl group, a butyl group, or a cyclohexyl group; and $R^1$, $R^2$, and $R^3$ are more preferably a methyl group, hydrogen, and a methyl group, respectively.

The glutarimide acrylic resin may contain only one kind of glutarimide unit or two or more kinds of glutarimide units wherein any one or all of $R^1$, $R^2$, and $R^3$ in the general formula (1) are different.

The glutarimide unit can be formed by imidizing a (meth)acrylate unit represented by the following general formula (2). Alternatively, the glutarimide unit may be formed by imidizing an acid anhydride (e.g. maleic anhydride), a half ester obtained from the acid anhydride and a linear or branched alcohol having 1 to 20 carbon atoms, or an α,β-ethylenically unsaturated carboxylic acid (e.g., acrylic acid, methacrylic acid, maleic acid, itaconic acid, crotonic acid, fumaric acid, or citraconic acid).

The glutarimide unit content of the glutarimide acrylic resin is not particularly limited, and can be appropriately determined in consideration of, for example, the structure of $R^3$. However, the glutarimide unit content is preferably 1.0 wt % or more, more preferably 3.0 to 90 wt %, even more preferably 5.0 to 60 wt % with respect to the total weight of the glutarimide acrylic resin (D). If the glutarimide unit content is less than the above range, a resulting glutarimide acrylic resin tends to be poor in heat resistance or tends to have impaired transparency. On the other hand, if the glutarimide unit content exceeds the above range, heat resistance and melt viscosity become unnecessarily high, which tends to deteriorate molding processability, significantly decrease the mechanical strength of a resulting film when the film is processed, or impair the transparency.

The glutarimide unit content is calculated in the following manner.

The resin is subjected to $^1$H-NMR analysis using $^1$H-NMR BRUKER Avance 111 (400 MHz) to determine the amount (mol %) of each monomer unit, such as a glutarimide unit or an ester unit contained in the resin, and then the monomer unit content (mol %) is converted to a monomer unit content (wt %) using the molecular weight of each monomer unit.

For example, when the resin is formed of a glutarimide unit whose $R^3$ in the general formula (1) is a methyl group and a methyl methacrylate unit, a glutarimide unit content (wt %) can be determined from the following calculation formula using the area a of a peak derived from protons of O—CH$_3$ of methyl methacrylate and appearing at about 3.5 to 3.8 ppm and the area b of a peak derived from protons of N—CH$_3$ of the glutarimide and appearing at about 3.0 to 3.3 ppm.

[Methyl methacrylate unit content $A$(mol %)]=100× $a/(a+b)$

[Glutarimide unit content $B$(mol %)]=100×$b/(a+b)$

[Glutarimide unit content(wt %)]=100×($b$×(molecular weight of glutarimide unit)$)/(a$×(molecular weight of methyl methacrylate unit)+$b$×(molecular weight of glutarimide unit))

It is to be noted that even when the resin contains a monomer unit other than the above units, the glutarimide unit content (wt %) can be determined in the same manner as described above from the amount (mol %) of each monomer unit contained in the resin and the molecular weight of each monomer unit.

When the acrylic resin composition of the present invention is used for, for example, a polarizer protective film, the glutarimide unit content is preferably 20 wt % or less, more preferably 15 wt % or less, even more preferably 10 wt % or less because birefringence is more easily suppressed.

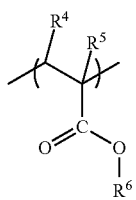

(2)

In the general formula (2), $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or an aromatic ring-containing substituent having 5 to 15 carbon atoms. Hereinafter, the unit represented by the general formula (2) is also referred to as "(meth)acrylate unit." It is to be noted that in the present application, "(meth)acrylic" refers to "methacrylic or acrylic."

In the general formula (2), $R^4$ and $R^5$ are preferably each independently hydrogen or a methyl group and $R^6$ is preferably hydrogen or a methyl group, and $R^4$, $R^5$, and $R^6$ are more preferably hydrogen, a methyl group, and a methyl group, respectively.

The glutarimide acrylic resin may contain only one kind of (meth)acrylate unit or two or more kinds of (meth) acrylate units wherein any one or all of $R^4$, $R^5$, and $R^6$ in the general formula (2) are different.

If necessary, the glutarimide acrylic resin may further contain a unit represented by the following general formula (3) (hereinafter, also referred to as "aromatic vinyl unit"):

(3)

wherein $R^7$ is hydrogen or an alkyl group having 1 to 8 carbon atoms and $R^8$ is an aryl group having 6 to 10 carbon atoms.

The aromatic vinyl unit represented by the general formula (3) is not particularly limited, and examples thereof include a styrene unit and an α-methylstyrene unit. The aromatic vinyl unit is preferably a styrene unit.

The glutarimide acrylic resin may contain only one kind of aromatic vinyl unit or two or more kinds of aromatic vinyl units wherein either one or both of $R^7$ and $R^8$ are different.

The aromatic vinyl unit content of the glutarimide acrylic resin is not particularly limited, but is preferably 0 to 50 wt %, more preferably 0 to 20 wt %, particularly preferably 0 to 15 wt % with respect to the total weight of the glutarimide acrylic resin. If the aromatic vinyl unit content exceeds the above range, the glutarimide acrylic resin cannot have sufficient heat resistance.

However, in the present invention, the glutarimide acrylic resin preferably contains no aromatic vinyl unit from the viewpoint of improving bending resistance and transparency, reducing fish eyes, and improving solvent resistance or weather resistance.

If necessary, the glutarimide acrylic resin may further contain a different unit other than the glutarimide unit, the (meth)acrylate unit, and the aromatic vinyl unit.

Examples of the different unit include amide-based units (e.g. an acrylamide and a methacrylamide), glutaric anhydride units, nitrile-based units (e.g. acrylonitrile and methacrylonitrile), and maleimide-based units (e.g. maleimide, N-methylmaleimide, N-phenylmaleimide, and N-cyclohexylmaleimide).

The different unit may be incorporated into the glutarimide acrylic resin by random copolymerization or graft copolymerization.

The different unit may be incorporated by copolymerization of a monomer constituting the different unit with the glutarimide acrylic resin and/or a resin as a raw material for producing the resin. Alternatively, the different unit incorporated into the resin may be a by-product of the above-mentioned imidization reaction.

The weight average molecular weight of the glutarimide acrylic resin is not particularly limited, but is preferably in the range of $1\times10^4$ to $5\times10^5$. By setting the weight average molecular weight of the glutarimide acrylic resin to a value within the above range, it is possible to prevent deterioration of molding processability or to prevent a resulting film from having poor mechanical strength when the film is processed. On the other hand, if the weight average molecular weight is less than the above lower limit, a resulting film tends to have poor mechanical strength. Further, if the weight average molecular weight exceeds the above range, viscosity during melt extrusion tends to be high, molding processability tends to be deteriorated, and productivity of a molded article tends to be reduced.

The glass transition temperature of the glutarimide acrylic resin is 120° C. or higher so that a resulting film can have excellent heat resistance. Preferably, the glass transition temperature of the glutarimide acrylic resin is 125° C. or higher. If the glass transition temperature of the glutarimide acrylic resin is lower than the above range, a resulting film cannot have sufficient heat resistance.

The acid value of the glutarimide acrylic resin is not particularly limited, but is preferably 0.50 mmol/g or less, more preferably 0.45 mmol/g or less. The lower limit of the acid value is not particularly limited, but is preferably 0 mmol/g or more, more preferably 0.05 mmol/g or more, particularly preferably 0.10 mmol/g or more. By setting the acid value to a value within the above range, the glutarimide acrylic resin can provide an excellent balance of heat resistance, mechanical properties, and molding processability. On the other hand, if the acid value exceeds the above range, foaming of the resin is likely to occur during melt extrusion for film formation, which tends to deteriorate molding processability and to reduce productivity of a molded article. It is to be noted that the acid value can be calculated by, for example, a titration method described in JP 2005-23272 A.

The glutarimide acrylic resin can be produced by, for example, a known method described in JP 2010-261025 A.

The crosslinked polymer layer contained in the graft copolymer (C) is preferably blended in such a manner that the total amount of such layer is 1 to 60 parts by weight, more preferably 1 to 30 parts by weight, even more preferably 1 to 25 parts by weight, with respect to 100 parts by weight of the optical resin material of the present invention. If the amount of the crosslinked polymer layer is less than 1 part by weight, there is a case where the crack resistance or vacuum moldability of the film is deteriorated or the film has poor optical isotropy due to an increase in photoelastic constant. On the other hand, if the amount of the crosslinked polymer layer exceeds 60 parts by weight, the heat resistance, surface hardness, transparency, or resistance to whitening on bending of the film tend to be deteriorated.

If necessary, the optical resin material of the present invention may be blended with birefringent inorganic microparticles described in Japanese Patent No. 3648201 or Japanese Patent No. 4336586 or a birefringent low molecular compound having a molecular weight of 5000 or less, preferably 1000 or less described in Japanese Patent No. 3696649 to adjust orientation birefringence.

If necessary, the optical resin material of the present invention may contain a known additive (e.g. light stabilizers, UV absorbers, heat stabilizers, delustrants, light diffusers, colorants, dyes, pigments, antistatic agents, heat reflecting agents, lubricants, plasticizers, UV absorbers, stabilizers, and fillers) or another resin.

The optical resin material of the present invention may be subjected to molding, such as extrusion molding, injection molding, compression molding, blow molding, or spinning molding, under heating directly in the form of particles or after pelletization using an extruder to give a molded article having a shape suitable for its intended use. The optical resin material of the present invention is particularly useful as a film, and is successfully processed by, for example, a conventional melt extrusion method such as an inflation method or a T-die extrusion method, a calendering method, or a solvent casting method. Among them, a melt extrusion method using no solvents is preferred. The use of a melt extrusion method makes it possible to reduce production cost or loads on the global environment or working environment caused by solvents.

When the optical resin material of the present invention is formed into a film, both surfaces of the film may be brought into contact with (sandwiched between) rolls or metal belts, especially rolls or metal belts heated to a temperature around the glass transition temperature of the film, at the same time, if necessary, so that the film having higher surface properties may be obtained. Further, the film may be subjected to lamination molding or may be modified by biaxial stretching depending on its intended use.

The optical resin material of the present invention can be formed into a film even under such high-temperature molding conditions that T-die film formation is used without causing contamination of the molding machine due to scattering of a UV absorber or film defects.

A method for producing a film by melt-extrusion molding of the optical resin material of the present invention will be described in detail.

It is to be noted that in the following description, a film formed by melt extrusion is referred to as "melt-extruded film" to differentiate it from a film formed by another method such as solution casting.

When the optical resin material of the present invention is formed into a film by melt extrusion, the optical resin material of the present invention is first supplied to an extruder and then melted by heating.

The optical resin material is preferably predried before supplied to the extruder. By performing such predrying, it is possible to prevent foaming of the resin extruded from the extruder.

The method for predrying is not particularly limited, but for example, a raw material (i.e., the optical resin material of the present invention) may be predried by a hot air drier or the like after formed into pellets or the like.

Further, the extruder for molding the optical resin material of the present invention preferably has one or more devolatilizers for removing volatile matter produced during melting by heating. By providing one or more devolatilizers, it is possible to reduce deterioration of film appearance due to foaming or decomposition/deterioration reaction of the resin.

Moreover, during melt extrusion for molding the optical resin material of the present invention, an inert gas is preferably supplied to a cylinder of the extruder together with the resin material. By supplying an inert gas, it is possible to reduce the concentration of oxygen in a system to reduce decomposition caused by oxidation degradation, crosslinking, or degradation of appearance or quality such as yellowing.

Then, the optical resin material melted by heating in the extruder is supplied through a gear pump or a filter to a T-die. By using a gear pump at this time, it is possible to improve uniformity of the amount of the resin to be extruded to reduce thickness variation. On the other hand, the use of a filter makes it possible to remove foreign substances in the optical resin material to give a film having excellent appearance without defects.

The filter to be used is preferably a stainless steel leaf-disk filter that can remove foreign substances from a melted polymer, and a filter element to be used is preferably of fiber type, powder type, or complex type thereof. The filter can be preferably used for an extruder or the like for use in pelletization or film formation.

Then, the optical resin material supplied to the T-die is extruded through the T-die as a sheet-shaped melted resin.

The sheet-shaped melted resin is preferably sandwiched between two cooling rolls and then cooled to form a film.

One of the two cooling rolls sandwiching the sheet-shaped melted resin is preferably a rigid metal roll having a smooth surface and the other cooling roll is preferably a flexible roll provided with a metal elastic external cylinder that has a smooth surface and is elastically deformable.

By cooling the sheet-shaped melted resin sandwiched between such rigid metal roll and flexible roll having a metal elastic external cylinder to form a film, it is possible to correct surface microirregularities or die lines to give a film having a smooth surface and a thickness variation of 5 μm or less.

It is to be noted that the term "cooling roll" used in this specification includes the meaning of "touch roll" and "cooling roll."

Even when the above-mentioned rigid metal roll and flexible roll are used, when a film to be formed is thin, there is a case where the surfaces of the cooling rolls come into contact with each other so that the external surfaces of the cooling rolls are damaged or the cooling rolls themselves are broken because both the cooling rolls have a metallic surface.

Therefore, when sandwiched between such two cooling rolls as described above to form a film, the sheet-shaped melted resin is first sandwiched between the two cooling rolls and then cooled to give a film.

An optical resin material of the present invention has very high toughness and excellent flexibility, and therefore does not need to be stretched to improve strength, which increases productivity due to omission of a stretching process and has a cost advantage. An optical film made of the optical resin material of the present invention (an optical film of the present invention) with high transparency and high strength can have a thickness of 10 μm or more. Furthermore, orientation birefringence of the optical film obtained by stretching does not substantially occur, and such a film is optically isotropic.

The value of orientation birefringence of the molded body made of the optical resin material of the present invention is preferably $-15 \times 10^{-4}$ to $15 \times 10^{-4}$, more preferably $-10 \times 10^{-4}$ to $10 \times 10^{-4}$, even more preferably $-5 \times 10^{-4}$ to $5 \times 10^{-4}$, still more preferably $-1.6 \times 10^{-4}$ to $1.6 \times 10^{-4}$, still furthermore preferably $-1 \times 10^{-4}$ to $1 \times 10^{-4}$, particularly preferably $-0.5 \times 10^{-4}$ to $0.5 \times 10^{-4}$, most preferably $-0.2 \times 10^{-4}$ to $0.2 \times 10^{-4}$. If the orientation birefringence is within the above range, it is possible to obtain a molded body without the occurrence of birefringence during molding processing and without a problem in its practical use.

Above all, the value of orientation birefringence of the optical film of the present invention is preferably $-2 \times 10^{-4}$ to $2 \times 10^{-4}$, more preferably $-1.6 \times 10^{-4}$ to $1.6 \times 10^{-4}$, even more preferably $-1.5 \times 10^{-4}$ to $1.5 \times 10^{-4}$, still more preferably $-1.0 \times 10^{-4}$ to $1.0 \times 10^{-4}$, especially preferably $-0.5 \times 10^{-4}$ to $0.5 \times 10^{-4}$, most preferably $-0.2 \times 10^{-4}$ to $0.2 \times 10^{-4}$. If the orientation birefringence of the film is within the above range, it is possible to obtain stable optical characteristics without the occurrence of birefringence during molding processing. In addition, the film of the present invention is very suitable as an optical film to be used in a liquid crystal display or the like.

The molded body made of the optical resin material of the present invention preferably has a photoelastic constant of $-10 \times 10^{-12}$ to $10 \times 10^{-12}$, more preferably $-4 \times 10^{-12}$ to $4 \times 10^{-12}$, even more preferably $-2 \times 10^{-12}$ to $2 \times 10^{-12}$, still more preferably $-1 \times 10^{-12}$ to $1 \times 10^{-12}$, still furthermore preferably $-0.5 \times 10^{-12}$ to $0.5 \times 10^{-12}$, most preferably $-0.3 \times 10^{-12}$ to $0.3 \times 10^{-12}$. When the photoelastic constant of the molded body is within the above range, the molded body exhibits only small birefringence even when stress is applied thereto in an environment of, for example, high temperature and high humidity, and therefore can be practically used without problem.

Above all, the optical film of the present invention preferably has a photoelastic constant of $-10 \times 10^{-12}$ Pa$^{-1}$ to $10 \times 10^{-12}$ Pa$^{-1}$, more preferably $-7 \times 10^{-12}$ Pa$^{-1}$ to $7 \times 10^{-12}$ Pa$^{-1}$, even more preferably $-4 \times 10^{-12}$ Pa$^{-1}$ to $4 \times 10^{-12}$ Pa$^{-1}$, particularly preferably $-2 \times 10^{-12}$ Pa$^{-1}$ to $2 \times 10^{-12}$ Pa$^{-1}$. Further, the photoelastic constant of such film is preferably $-1.5 \times 10^{-12}$ Pa$^{-1}$ to $1.5 \times 10^{-12}$ Pa$^{-1}$, more preferably $-1.0 \times 10^{-12}$ Pa$^{-1}$ to $1.0 \times 10^{-12}$ Pa$^{-1}$, even more preferably $-0.5 \times 10^{-12}$ Pa$^{-1}$ to $0.5 \times 10^{-12}$ Pa$^{-1}$, still more preferably $-0.3 \times 10^{-12}$ Pa$^{-1}$ to $0.3 \times 10^{-12}$ Pa$^{-1}$ or less. If the photoelastic constant of the film is within the above range, the optical film of the present invention exhibits small birefringence even when the film is used in a liquid crystal display device or stress is applied to the molded body in an environment of, for example, high temperature and high humidity. As a result, a phase difference variation, a reduction in the contrast of peripheral area of a display screen, and light leakage do not occur.

The optical film of the present invention preferably has a haze value of 2.0% or less, more preferably 1.0% or less, even more preferably 0.8% or less, particularly preferably 0.5% or less. When the optical film of the present invention has a haze value within the above range, the transparency of the film is sufficiently high, and therefore the optical film is suitable for optics applications, decorative applications, interior applications, or vacuum molding applications requiring transparency.

The optical film of the present invention preferably has a total light transmittance of 85% or more, more preferably 88% or more. When the optical film of the present invention has a total light transmittance within the above range, the transparency of the film is sufficiently high, and therefore the film is suitable for optics applications, decorative applications, interior applications, or vacuum molding applications requiring transparency.

The optical film of the present invention preferably has a tensile elongation at break of 10% or more, more preferably 20% or more, even more preferably 30% or more, still more preferably 40% or more, still furthermore preferably 50% or more, particularly preferably 60% or more, most preferably 90% or more. When having a tensile elongation at break within the above range, the optical film of the present invention is less likely to be cracked when cut out with a Thomson blade or a cutter blade (trimming property) and is less likely to be broken when rolled up or when the surface thereof is subjected to post-processing such as coating, vapor deposition, sputtering, or bonding to a protective film. Further, the film has high crack resistance against bending, and therefore problems such as cracks do not occur not only when the film is subjected to post-processing but also when the film is practically used as a product. The crack resistance is particularly correlated with tensile elongation at break, and a higher tensile elongation at break means higher crack resistance.

Particularly, when the optical film of the present invention is used as a polarizer protective film, the film preferably has low optical anisotropy. In particular, the optical anisotropy of the film is preferably low not only in its in-plane direction (length and width directions) but also in its thickness direction. In other words, both the in-plane phase difference and the absolute value of the thickness direction phase difference of the film are preferably small. More specifically, the in-plane phase difference is preferably 10 nm or less, more preferably 6 nm or less, even more preferably 5 nm or less, still more preferably 3 nm or less. Also, the absolute value of the thickness direction phase difference is preferably 50 nm or less, more preferably 20 nm or less, even more preferably 10 nm or less, most preferably 5 nm or less. An optical film having such a phase difference can be preferably used as a polarizer protective film of a polarizing plate in a liquid crystal display device. On the other hand, if a film having an in-plane phase difference exceeding 10 nm or an absolute value of thickness direction phase difference exceeding 50 nm is used as a polarizer protective film of a polarizing plate in a liquid crystal display device, there is a case where a problem such as a reduction in the contrast of the liquid crystal display device occurs.

The in-plane phase difference (Re) and thickness direction phase difference (Rth) can be calculated by the following formulas, respectively. In the case of an ideal film that is completely optically isotropic in three dimensional directions, its in-plane phase difference Re and thickness direction phase difference Rth are both zero.

$$Re = (nx - ny) \times d$$

$$Rth = ((nx + ny)/2 - nz) \times d$$

In the above formulas, nx, ny, and nz represent a refractive index in an X-axis direction that is an in-plane stretching direction (orientation direction of polymer chains), a refractive index in a Y-axis direction that is a direction perpendicular to the X axis, and a refractive index in a Z-axis direction that is a film thickness direction, respectively; d represents a film thickness; and nx−ny represents orientation birefringence. It is to be noted that in the case of a melt-extruded film, MD direction corresponds to the X axis, and in the case of a stretched film, the stretching direction corresponds to the X axis.

The optical film of the present invention preferably has a glass transition temperature of 80° C. or higher, more preferably 90° C. or higher, even more preferably 100° C. or higher, still more preferably 110° C. or higher, most preferably 120° C. or higher. When having a glass transition temperature within the above range, the optical film of the present invention can have sufficiently high heat resistance. The optical film of the present invention exhibits small shrinkage due to heat during the secondary molding such as vacuum molding or in use at high temperatures.

The thickness of the optical film of the present invention is not particularly limited, but is preferably 500 μm or less, more preferably 300 μm or less, particularly preferably 200 μm or less. Further, the thickness of the optical film of the present invention is preferably 10 μm or more, more preferably 30 μm or more, even more preferably 50 μm or more, particularly preferably 100 μm or more. If the thickness of the film is within the above range, for example, when the film is used as an optical film for display applications, it is possible to produce a film having uniform optical characteristics and good transparency. On the other hand, if the thickness of the film exceeds the above range, the film after molding is non-uniformly cooled and therefore tends to have non-uniform optical characteristics. In addition, if the thickness of the film is less than the above range, there is a case where the film may be difficult to handle.

The optical film of the present invention achieves the above effects even in an unstretched state, but it can be further stretched to further improve the mechanical strength and thickness accuracy. Moreover, by selecting suitable stretching conditions, a film with small thickness variation can be easily produced without substantially causing birefringence and without substantially increasing haze.

When the optical film according to the present invention is a stretched film, the stretched film (uniaxially stretched film or biaxially stretched film) can be produced by once molding the optical resin material according to the present invention to form an unstretched film and then subjecting the unstretched film to uniaxial stretching or biaxial stretching. For example, a sheet-shaped melted resin is sandwiched between the above-mentioned two cooling rolls and then cooled to once obtain an unstretched film having a thickness of 150 μm, and then the film is biaxially stretched longitudinally and laterally to have a thickness of 40 μm.

In this specification, for convenience of description, an unstretched film that is obtained by molding the optical resin material of the present invention but is not subjected to stretching is referred to as "raw material film."

When stretched, the raw material film may be continuously subjected to stretching immediately after molding or may be subjected to stretching after once stored or transferred after molding.

It is to be noted that when stretched immediately after molding, the raw material film may be stretched in a very short time (in some cases, instantaneously) after molding in a film production process or may be once produced and then stretched after a lapse of time.

When the optical film of the present invention is stretched, the raw material film shall be kept in a film form good enough to be stretched and does not always need to be in a perfect film state.

A method for stretching the raw material film is not particularly limited, and any conventionally known stretching method may be used. More specifically, the raw material film may be subjected to, for example, lateral stretching using a tenter, longitudinal stretching using a roll, or sequential biaxial stretching in which such lateral stretching and longitudinal stretching are sequentially combined.

Alternatively, the stretching method may be a simultaneous biaxial stretching method in which lateral stretching and longitudinal stretching are simultaneously performed or a method in which longitudinal stretching using a roll is performed and then lateral stretching using a tenter is performed.

When stretched, the raw material film is preferably once preheated to a temperature higher than the stretching temperature by 0.5 to 5° C., preferably 1 to 3° C. and then cooled to the stretching temperature before stretching.

By preheating the raw material film to a temperature within the above range, it is possible to accurately maintain the thickness of the raw material film or to prevent a resulting stretched film from having low thickness accuracy or thickness variation. Further, it is possible to prevent the raw material film from adhering to a roll or sagging under its own weight.

On the other hand, if the preheating temperature of the raw material film is too high, an adverse effect, such as adhesion of the raw material film to a roll or sagging of the raw material film under its own weight tends to occur. Further, if a difference between the preheating temperature and the stretching temperature of the raw material film is small, the raw material film before stretching tends to be difficult to maintain thickness accuracy or a resulting stretched film tends to have large thickness variation or low thickness accuracy.

It is to be noted that in the optical resin material of the present invention, it is difficult to improve thickness accuracy by utilizing a necking phenomenon when the molded raw material film is stretched. Therefore, in the present invention, control of the above-mentioned preheating temperature is important to maintain or improve the thickness accuracy of a resulting film.

The stretching temperature at which the raw material film is stretched is not particularly limited, and may be changed according to mechanical strength, surface properties, and thickness accuracy required of a stretched film to be produced.

In general, when the glass transition temperature of the raw material film determined by a DSC method is defined as Tg, the stretching temperature is preferably in the range of (Tg−30° C.) to (Tg+30° C.), more preferably in the range of (Tg−20° C.) to (Tg+20° C.), and even more preferably in the range of (Tg) to (Tg+20° C.).

When the stretching temperature is within the above range, it is possible to reduce the thickness variation of a resulting stretched film and to improve the mechanical properties of the film such as percentage of elongation, tear propagation strength, and resistance to flexural fatigue. Further, it is possible to prevent the occurrence of problems such as adhesion of the film to a roll.

On the other hand, if the stretching temperature is higher than the above range, a resulting stretched film tends to have large thickness variation or the mechanical properties of the film, such as percentage of elongation, tear propagation strength, and resistance to flexural fatigue, tend not to be sufficiently improved. Further, problems such as adhesion of the film to a roll tend to occur.

If the stretching temperature is lower than the above range, a resulting stretched film tends to have a large haze or, in an extreme case, problems such as the occurrence of tearing or cracks in the film tend to occur during the production process.

When the raw material film is stretched, its stretching ratio is not particularly limited, either, and may be determined according to the mechanical strength, surface properties, and thickness accuracy of a stretched film to be produced. In general, depending on the stretching temperature, the stretching ratio is preferably selected in the range of 1.1 to 3 times, more preferably in the range of 1.3 to 2.5 times, even more preferably in the range of 1.5 to 2.3 times.

When the stretching ratio is within the above range, it is possible to significantly improve the mechanical properties of the film such as percentage of elongation, tear propagation strength, and resistance to flexural fatigue. Therefore, it is possible to produce a stretched film that has a thickness variation of 5 μm or less, exhibits substantially no birefringence, and has a haze of 2.0% or less.

The optical film according to the present invention may be used after being laminated to another film with an adhesive or after a coating layer such as a hard coat layer is formed on the surface, as needed.

If necessary, the surface gloss of the optical film of the present invention may be reduced by a known method. This can be achieved by, for example, kneading an inorganic filler or crosslinked polymer particles with the optical resin material. Alternatively, the film obtained may be embossed to reduce its surface gloss.

Since the optical film of the present invention is excellent in optical characteristics such as optical homogeneity and transparency, it is particularly suitable for use in known optical applications (optical films), such as peripheral materials of liquid crystal display devices such as optically isotropic films, polarizer protective films, and transparent conductive films.

The optical film of the present invention may be bonded to a polarizer to be used as a polarizing plate. That is, the optical film of the present invention may be used as a polarizer protective film of a polarizing plate. The polarizer is not particularly limited and any conventionally known polarizer may be used. A specific example of such a polarizer is iodine-doped stretched polyvinyl alcohol.

If necessary, the optical film of the present invention may be subjected to surface treatment. For example, when the optical film of the present invention is subjected to surface finishing such as coating or another film is laminated on the surface of the optical film of the present invention, the optical film is preferably subjected to surface treatment. By subjecting the optical film of the present invention to such surface treatment, it is possible to improve adhesion between the optical film of the present invention and a coating material or another film to be laminated thereon.

It is to be noted that the purpose of surface treatment of the optical film of the present invention is not limited to the above purposes. The optical film of the present invention may be subjected to surface treatment regardless of its intended use. Such surface treatment is not particularly limited, and examples thereof include corona treatment, plasma treatment, ultraviolet irradiation, and alkali treatment. Among them, corona treatment is preferred.

Although the optical film of the present invention is most suitable for optical applications as an optical film, it may be used for various purposes for its properties such as heat resistance, transparency, and flexibility. More specifically, the optical film of the present invention can be used for the interior and exterior of automobiles, personal computers, mobile devices, and solar batteries; solar battery back sheets; photographic lenses for cameras, VTRs, and projectors; finders, filters, prisms, Fresnel lenses, and the like for use in the field of imaging; lenses such as pick-up lenses for optical discs in CD players, DVD players, MD players, and the like for use in the field of lens; optical discs such as CDs, DVDs, and MDs for use in the field of optical recording; films for liquid crystal displays such as light guide plates, diffuser plates, back sheets, reflection sheets, polarizer protective films, polarizing film transparent resin sheets, phase difference films, light diffusing films, and prism sheets, surface protective films, and the like for use in the field of information devices; optical fibers, optical switches, optical connectors, and the like for use in the field of optical communications; automobile headlights, tail lamp lenses, inner lenses, instrument covers, sunroofs, and the like for use in the field of vehicles; medical devices such as eyeglasses, contact lenses, lenses for endoscopes, and medical supplies requiring sterilization for use in the medical field; road signs, bathroom fitments, floor materials, translucent panels for roads, lenses for double glazing, lighting windows, carports, lenses for lighting, lighting covers, sidings for construction materials, and the like for use in the fields of architecture and construction materials; microwave cooking vessels (dishes); housings for home appliances; toys; sunglasses; and stationery. The film of the present invention can be used also as a substitute for a molded article made of a transfer foil sheet.

In addition to films, examples of the usage of the molded article of the optical resin material of the present invention include lenses such as lenses for common cameras, lenses for video cameras, object lenses, diffraction gratings, holograms, and collimator lenses for laser pickup, fθ lenses for laser printers, cylindrical lenses, condenser lenses or projector lenses for liquid crystal projectors, Fresnel lenses, and lenses for eyeglasses, disc substrates for compact discs (e.g., CDs and CD-ROMs), mini discs (MDs), and DVDs, members for liquid crystal elements such as light guide plates for liquid crystals, films for liquid crystals, substrates for LCDs, and adhesives for bonding liquid crystal elements, screens for projectors, optical filters, optical fibers, optical waveguides, prisms, lenses for lighting, automobile headlights, medical supplies requiring sterilization, microwave cooking vessels, housings for home appliances, toys, and recreation items.

The optical film of the present invention may be laminated on a metal or plastic for use. Examples of a method for laminating the film include lamination molding; wet lamination in which an adhesive is applied onto a metal plate such as a steel plate and then the film is laminated on and bonded to the metal plate by drying; dry lamination; extrusion lamination; and hot-melt lamination.

Examples of a method for laminating the film on a plastic part include insertion molding or laminate injection press molding of injecting a resin into a mold in which a film is provided, and in-mold molding of injecting a resin into a mold in which a pre-molded film is provided.

The laminate of the optical film of the present invention is most suitable for an optical material, but may be applied to other applications. For example, the laminate can be used as substitutes for paint such as automobile interior materials and automobile exterior materials, building materials such as window frames, bathroom fitments, wallpapers, and floor materials, daily goods, housings for furniture or electrical equipment, housings for OA equipment such as facsimiles, laptop computers, and copy machines, front panels of liquid crystal display screens of terminal equipment such as mobile phones, smartphones, and tablets, and parts of electric or electronic devices.

EXAMPLES

Hereinbelow, the present invention will be described more specifically with reference to examples, but is not limited to these examples. In the following description, "part(s)" and "%" represent "part(s) by weight" and "wt %/o," respectively unless otherwise specified.

(Volume Average Particle Diameter to (Meth)Acrylic Crosslinked Polymer Layer of Graft Copolymer)

The volume average particle diameter to the (meth)acrylic crosslinked polymer layer of the graft copolymer (volume average particle diameter of acrylic rubber particles) was measured using an acrylic rubber particle latex. The volume average particle diameter (μm) was measured using, as a measuring instrument, MICROTRAC UPA150 manufactured by NIKKISO CO., LTD.

(Polymerization Conversion)

First, part of the obtained slurry was sampled and accurately weighed, dried in a hot-air drier at 120° C. for 1 hour, and then accurately weighed to determine the dry weight as a solid matter content. Then, the ratio between the results of accurate measurement before and after drying was determined as the solid component ratio of the slurry. Finally, the polymerization conversion was calculated by the following formula using the solid component ratio. It is to be noted that in this calculation formula, a chain transfer agent was regarded as a monomer charged.

Polymerization conversion (%)=[(Total weight of raw materials charged×solid component ratio−total weight of raw materials other than water and monomers)/weight of monomers charged]×100

(Measurement of Graft Ratio)

In 50 mL of methyl ethyl ketone, 2 g of the graft copolymer (C) obtained was dissolved, and the solution was separated into an insoluble matter and a soluble matter by centrifugation using a centrifugal separator (CP60E manufactured by Hitachi Koki Co., Ltd.) at 30000 rpm for 1 hour (three sets of centrifugation were performed in total). The thus obtained insoluble matter was used to calculate the graft ratio by the following formula.

Graft ratio (%)={(Weight of methyl ethyl ketone insoluble matter−Weight of crosslinked polymer layer(A))/Weight of crosslinked polymer layer (A)}×100

It is to be noted that the weight of a crosslinked polymer layer refers to the weight of monofunctional monomers charged that constitute the crosslinked polymer layer.

(Glass Transition Temperature)

The temperature of a sample was once increased to 200° C. at a rate of 25° C./min by a differential scanning calorimeter (DSC) SSC-5200 manufactured by Seiko Instruments Inc., held at 200° C. for 10 minutes, and decreased to 50° C. at a rate of 25° C./min for preliminary adjustment. Then, the DSC curve of the sample was measured while the temperature of the sample was increased to 200° C. at a temperature rise rate of 10° C./min. The value of integral of the obtained DSC curve (DDSC) was determined, and the glass transition temperature of the sample was determined from its maximum point.

(Total Light Transmittance and Haze Value)

The total light transmittance and haze value of a film were measured by a method specified in JIS K7105 using NDH-300A manufactured by NIPPON DENSHOKU INDUSTRIES CO., LTD.

(Film Thickness)

The thickness of a film was measured using a digimatic indicator manufactured by Mitutoyo Corporation.

(Formation of Uniaxially Stretched Film and Measurement of Orientation Birefringence)

A 25 mm×90 mm test specimen was cut out from an unstretched original film having a thickness of 125 μm (so that the long sides were in the MD direction), both the short sides of the test specimen were held while the test specimen was maintained at a temperature higher by 30° C. than its glass transition temperature for 2 minutes, and the test specimen was uniaxially stretched twice (also referred to as "stretched 100%") at a rate of 200 mm/min in the longitudinal direction (at this time, both the long sides of the test specimen were not fixed). Thereafter, the thus obtained film was cooled to 23° C. and a sample was taken from the central portion of the film for the measurement of birefringence (orientation birefringence) with the use of an automatic birefringence meter (KOBRA-WR manufactured by Oji Scientific Instruments) at a temperature of 23±2° C., a humidity of 50±5%, a wavelength of 590 nm, and an incidence angle of 00. At the same time, in-plane phase difference Re and thickness direction phase difference Rth (incidence angle: 400) were also measured (measurement of in-plane phase difference Re and thickness direction phase difference Rth will be described in detail later).

(Measurement of Orientation Birefringence of Press-Molded Sheet)

A 25 mm×90 mm test specimen was cut out from the central portion of the press-molded sheet prepared in each of the examples and comparative examples (thickness 500 μM). The birefringence was measured in the same manner as in the measurement of the orientation birefringence of the uniaxially stretched film.

(Orientation Birefringence of Unstretched Original Film and Press-Molded Sheet)

A 40 mm×40 mm test specimen was cut out from an unstretched original film (thickness 125 µm) and a press-molded sheet (thickness 500 µm). The orientation birefringence was measured with the use of an automatic birefringence meter (KOBRA-WR manufactured by Oji Scientific Instruments) at a temperature of 23±2° C., a humidity of 50±5%, a wavelength of 590 nm, and an incidence angle of 0°. At the same time, in-plane phase difference Re and thickness direction phase difference Rth (incidence angle: 40°) were also measured (measurement of in-plane phase difference Re and thickness direction phase difference Rth will be described in detail later).

(In-Plane Phase Difference Re and Thickness Direction Phase Difference Rth)

A 40 mm×40 mm test specimen was cut out from a film (thickness 125 µm) and a press-molded sheet (thickness 500 µm). The in-plane phase difference Re of this test specimen was measured with the use of an automatic birefringence meter (KOBRA-WR manufactured by Oji Scientific Instruments) at a temperature of 23±2° C., a humidity of 50±5%, a wavelength of 590 nm, and an incidence angle of 0°.

From the thickness d of the test specimen measured using a digimatic indicator (manufactured by Mitutoyo Corporation), the refractive index n measured using an Abbe refractometer (3T manufactured by ATAGO CO., LTD.), and the in-plane phase difference Re and the phase difference in a direction inclined at 40° measured using the automatic birefringence meter at a wavelength of 590 nm, three-dimensional refractive indexes nx, ny, and nz were determined to calculate the thickness direction phase difference, Rth=((nx+ny)/2−nz)×d. It is to be noted that the measured value was multiplied by 100 (µm)/film thickness (µm) to be converted to a value with respect to 100 µm thickness.

(Photoelastic Constant)

A strip-shaped test specimen of 15 mm×90 mm was cut out (so that the long side was in the TD direction) from an unstretched film having a thickness of 125 µm (original film). The photoelastic constant of the test specimen was measured using an automatic birefringence meter (KOBRA-WR manufactured by Oji Scientific Instruments) at a temperature of 23±2° C., a humidity of 50±5%, a wavelength of 590 nm, and an incidence angle of 0°. The measurement was performed in the following manner: one of the long sides of the film was fixed and birefringence was measured while a load applied to the other long side was increased from 0 kgf to 4 kgf by 0.5-kgf increments, and from the obtained results, the magnitude of a change in birefringence per unit stress was determined.

A 15 mm×90 mm test specimen was cut out from the central portion of the press-molded sheet prepared in each of the examples and comparative examples, and the photoelastic birefringence of the press-molded sheet was measured under the same measuring conditions as above.

(Evaluation of Mechanical Strength)

Mechanical strength was evaluated in terms of trimming property and tensile elongation at break as an indicator of crack resistance (tensile elongation: %).

Evaluation of Trimming Property

A film having a thickness of 125 µm and a press-molded sheet having a thickness of 500 µm were each cut using a cutter, and the cut surface of the film or sheet was observed to evaluate the trimming property of the film or sheet according to the following criteria.

◯: no cracks were observed in the cut surface
Δ: cracks were observed in the cut surface
x: cracks are significantly observed in the cut surface.

Tensile Elongation at Break

A film having a thickness of 125 µm was used. A tensile test was performed in accordance with ISO527-3 (JIS K 7127) using a type 5 test specimen at a test rate in MD of 200 mm/min, a temperature of 23±2° C., and a humidity of 50±5%.

Production Example 1

Production of Graft Copolymer (C1)

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.12 part |
| Sodium formaldehyde sulfoxylate | 0.15 part |
| Disodium ethylenediaminetetraacetate | 0.006 part |
| Ferrous sulfate | 0.0015 part |

Air in the polymerization apparatus was sufficiently purged with nitrogen gas so that there was substantially no oxygen in the polymerization apparatus. Then, the temperature in the polymerization apparatus was adjusted to 60° C., and 30.949 parts of a raw material mixture of acrylic rubber particles (A-1) shown in Table 1 was continuously added over a period of 150 minutes. After 25 minutes, 75 minutes, and 125 minutes from the start of the addition of (A-1), 0.1 part, 0.05 part, and 0.05 part of sodium polyoxyethylene lauryl ether phosphate (sodium salt of polyoxyethylene lauryl ether phosphate (manufactured by TOHO Chemical Industry Co., Ltd. under the trade name of PHOSPHANOL RD-510Y)) were respectively added to the polymerization apparatus. After completion of the addition, polymerization was further continued for 0.5 hour to give acrylic rubber particles (polymer of (A-1)). The polymerization conversion was 96.7%.

Then, 0.13 part of sodium polyoxyethylene lauryl ether phosphate was fed into the polymerization apparatus. Subsequently, 70.446 parts of a raw material mixture of a hard polymer layer (B-2) shown in Table 1 was continuously added over a period of 270 minutes and polymerization was further continued for 1 hour to give a graft copolymer latex. The polymerization conversion was 99.9%. The obtained latex was salted out and coagulated with magnesium sulfate, washed with water, and dried to give a white powder of a graft copolymer (C1).

The average particle diameter of rubber particles (polymer of A-1) of the graft copolymer (C1) was 84 nm. The graft ratio of the graft copolymer was 161%.

Production Example 2

Production of Non-Birefringent Resin (D) Containing No Crosslinked Structure

Into an 8-L glass reactor equipped with an H-type stirrer were fed 200 parts by weight of deionized water and 0.5 part by weight of disodium hydrogen phosphate. Then, with stirring at 300 rpm, 100.75 parts of a raw material mixture of a hard polymer layer (B-2) shown in Table 1 was added to the reactor, and the polymerization was started while purging the air in the reactor with nitrogen and raising the temperature to 70° C. At 35 minutes after the temperature reached 70° C., 0.06 part by weight of Adeka Pluronic F-68 (manufactured by ADEKA Co., Ltd, polyoxyethylene-polyoxypropylene block copolymer) was added as a non-ionic suspension stabilizer. Thereafter, the mixture was allowed to react at 70° C. for further 95 minutes, the temperature was raised to 80° C., and the mixture was stirred for 3 hours to complete the polymerization. The resulting polymer was washed four times using 3-fold amount of deionized water relative to the amount of the resin, and dried to give bead-like suspension polymer particles. The Mw of the resulting polymer was 153000.

Production Example 3

Production of Multilayer Structure Polymer (C2)

The following materials were fed into a polymerization apparatus having a capacity of 8 liters and equipped with a stirrer.

| Deionized water | 200 parts |
| Sodium polyoxyethylene lauryl ether phosphate | 0.45 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was substantially no oxygen in the polymerization apparatus. Then, the temperature in the polymerization apparatus was adjusted to 40° C. and 30.177 parts of a raw material mixture of acrylic rubber particles (A-1) shown in Table 2 was continuously added over a period of 90 minutes. After 12 minutes, 37 minutes, and 62 minutes from the start of the addition of (A-1), 0.11 part of sodium polyoxyethylene lauryl ether phosphate (sodium salt of polyoxyethylene lauryl ether phosphate (manufactured by TOHO Chemical Industry Co., Ltd. under the trade name of PHOSPHANOL RD-510Y)) was added to the polymerization apparatus. After completion of the addition, polymerization was further continued for 1 hour to give acrylic rubber particles (polymer of (A-1)). The polymerization conversion was 98.4%.

Then, the temperature in the polymerization apparatus was adjusted to 60° C., and 0.11 part of sodium polyoxyethylene lauryl ether phosphate and 0.1 part of sodium formaldehyde sulfoxylate were fed into the polymerization apparatus. Thereafter, 70.164 parts of a raw material mixture of a hard polymer layer (B-2) shown in Table 2 was continuously added over a period of 210 minutes. After 40 minutes, 80 minutes, 120 minutes, and 160 minutes from the start of the addition of (B-2), each 0.11 part of sodium polyoxyethylene lauryl ether phosphate was added to the polymerization apparatus. After completion of the addition, polymerization was further continued for 1 hour to give a graft copolymer latex. The polymerization conversion was 98.9%. The obtained latex was salted out and coagulated with magnesium sulfate, washed with water, and dried to give a white powder of a multilayer structure polymer (C2).

The average particle diameter of rubber particles (polymer of B-1) of the multilayer structure polymer (C2) was 57 nm. The graft ratio of the multilayer structure polymer (C2) was 151%.

Production Example 4

Production of Multilayer Structure Polymer (B3)

The following materials were fed into a polymerization apparatus having a capacity of 8 liters and equipped with a stirrer.

| Deionized water | 200 parts |
| Sodium polyoxyethylene lauryl ether phosphate | 0.005 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was substantially no oxygen in the polymerization apparatus. Then, the temperature in the polymerization apparatus was adjusted to 40° C., and 20.118 parts of a raw material mixture of acrylic rubber particles (A-1) shown in Table 2 was continuously added over a period of 60 minutes. After 30 minutes and 50 minutes from the start of the addition of (A-1), 0.21 part of sodium polyoxyethylene lauryl ether phosphate (sodium salt of polyoxyethylene lauryl ether phosphate (manufactured by TOHO Chemical Industry Co., Ltd. under the trade name of PHOSPHANOL RD-510Y)) was added to the polymerization apparatus. At 30 minutes after completion of the addition, 0.018 part of cumene hydroperoxide was added thereto and the polymerization was further continued for 1 hour to give acrylic rubber particles (polymer of (A-1)). The polymerization conversion was 98.3%.

Then, the temperature in the polymerization apparatus was adjusted to 60° C., and 0.21 part of sodium polyoxyethylene lauryl ether phosphate and 0.1 part of sodium formaldehyde sulfoxylate were fed into the polymerization apparatus. Thereafter, 80.4186 parts of a raw material mixture of a hard polymer layer (B-2) shown in Table 2 was continuously added over a period of 240 minutes. After 40 minutes, 80 minutes, 120 minutes, 160 minutes, and 200 minutes from the start of the addition of (B-2), 0.21 part, 0.21 part, 0.11 part, 0.11 part, and 0.11 part of sodium polyoxyethylene lauryl ether phosphate were respectively added to the polymerization apparatus. After completion of the addition, polymerization was further continued for 1 hour to give a graft copolymer latex. The polymerization conversion was 99.2%. The obtained latex was salted out and coagulated with magnesium sulfate, washed with water, and dried to give a white powder of a multilayer structure polymer (C3).

The average particle diameter of the rubber particles (polymer of A-1) of the multilayer structure polymer (C3) was 102 nm. The graft ratio of the multilayer structure polymer (C3) was 143%.

TABLE 2

| | Graft copolymer (C) | C1 | C2 | C3 | |
|---|---|---|---|---|---|
| | Non-birefringent resin (D) containing no crosslinked structure | | | | D1 |
| Acrylic crosslinked polymer layer (Acrylic rubber particles) (A-1) | Content of monofunctional monomer in (C) (parts) | 30 | 30 | 20 | |
| | Butyl acrylate (%) | 90 | 90 | 68.3 | |
| | Methyl methacrylate (%) | 10 | 10 | | |
| | Styrene (%) | | | 31.7 | |
| | Allyl methacrylate (parts) | 0.9 | 0.15 | 0.1 | |
| | Cumene hydroperoxide (parts) | 0.049 | 0.027 | 0.018 | |
| Volume average particle diameter of (A-1) (nm) | | 84 | 57 | 102 | |
| Hard polymer layer (B-2) | Content of monofunctional monomer in (C) (parts) | 70 | 70 | 80 | 100 |
| | Methyl methacrylate (%) | 47 | 48 | 88.3 | 47 |
| | Butyl acrylate (%) | 5 | 4 | 4 | 5 |
| | Benzyl methacrylate (%) | 6 | | | 6 |
| | 2,2,2-Trifluoroethyl methacrylate (%) | 42 | | | 42 |
| | Dicyclopentanyl methacrylate (%) | | 48 | | |
| | Phenoxyethyl methacrylate (%) | | | 7.7 | |
| | t-Dodecyl mercaptan (parts) | 0.2 | | 0.23 | |
| | Cumene hydroperoxide (parts) | 0.246 | 0.164 | 0.1886 | |
| | 2-Ethylhexyl thioglycolate (parts) | | | | 0.25 |
| | Perbutyl O*(parts) | | | | 0.5 |

*Perbutyl O: t-Butylperoxy-2-ethylhexanoate, manufactured by NOF Corporation

Examples 1 to 8 and Comparative Examples 1 to 2

Each composition of Examples 1 to 8 and Comparative Examples 1 to 2 shown in Table 2 was supplied at a rate of 10 kg/hr to a single screw extruder having a full flight screw with a diameter of 40 mm. The set temperature of temperature control zone of the extruder was 255° C. and the screw rotation speed of the extruder was 52 rpm. The resin extruded as a strand through a die provided at the outlet of the extruder was cooled in a water tank and pelletized by a pelletizer to give pellets.

In Examples 1 to 5 and Comparative Example 1, the obtained pellets were press-molded at 190° C. to give a press-molded sheet having a thickness of 500 µm. Various physical properties of these sheets were evaluated and shown in Table 3.

In Examples 6 to 8 and Comparative Example 2, the obtained pellets were supplied at a rate of 10 kg/hr to a single screw extruder equipped with a leaf disk filter with a pore size of 5 µm and connected to a T-die at the outlet thereof and melt-extruded with set temperature of temperature control zone of the extruder being 260° C. and the screw rotation speed of the extruder being 20 rpm to give a film having a thickness shown in Table 3. Various physical properties of the films were also evaluated.

TABLE 3

| | | | Example | | | | |
|---|---|---|---|---|---|---|---|
| | | | 1 | 2 | 3 | 4 | 5 |
| Non-birefringent resin (D) containing no crosslinked structure | | Kind | — | D1 | D1 | D1 | D1 |
| | | (Parts) | — | 90 | 70 | 50 | 30 |
| Graft copolymer (C) | | Kind | C1 | C1 | C1 | C1 | C1 |
| | | (Parts) | 100 | 10 | 30 | 50 | 70 |
| Film physical properties | Molding method | | Pressing | Pressing | Pressing | Pressing | Pressing |
| | Film thickness | (µm) | 500 | 500 | 500 | 500 | 500 |
| | Glass transition temperature | (° C.) | 89 | 90.0 | 89.9 | 89.1 | 87.9 |
| | Total light transmittance | (%) | | | | | |
| | Haze value | (%) | | | | | |
| | Crack resistance | Evaluation of trimming property | ○ | ○ | ○ | ○ | ○ |
| | | Tensile elongation at break | (%) | | | | |
| | | Evaluation of bending property | | ○ | ○ | ○ | ○ | ○ |
| | Unstretched | Photoelastic constant (×10⁻¹²) | (Pa⁻¹) | 0.17 | 0.85 | 0.62 | 0.62 | 0.37 |
| | | Orientation birefringence (×10⁻⁴) | | ±0.01 | ±0.01 | ±0.01 | ±0.01 | ±0.00 |
| | | Re (with respect to 100 µm) | nm | ±0.1 | ±0.1 | ±0.1 | ±0.1 | ±0.2 |
| | | Rth (with respect to 100 µm) | nm | 0.5 | 0.0 | 0.9 | −0.1 | 0.8 |
| | Stretched twice | Orientation birefringence (×10⁻⁴) | | −0.84 | 0.06 | −0.11 | −0.42 | −0.60 |
| | | Re (with respect to 100 µm) | nm | −8.4 | 0.6 | −1.1 | −4.2 | −6.0 |
| | | Rth (with respect to 100 µm) | nm | −4.7 | 0.3 | −0.4 | −2.4 | −3.4 |

| | | | Example | | | Comparative Example | |
|---|---|---|---|---|---|---|---|
| | | | 6 | 7 | 8 | 1 | 2 |
| Non-birefringent resin (D) containing no crosslinked structure | | Kind | D1 | | | D1 | D1 |
| | | (Parts) | 50 | | | 100 | 100 |
| Graft copolymer (C) | | Kind | C1 | C2 | C3 | | |
| | | (Parts) | 50 | 100 | 100 | | |
| Film physical | Molding method | | Melt extrusion | Melt extrusion | Melt extrusion | Pressing | Melt extrusion |

TABLE 3-continued

| properties | | | | | | | | |
|---|---|---|---|---|---|---|---|---|
| | Film thickness | | (μm) | 125 | 125 | 125 | 500 | 125 |
| | Glass transition temperature | | (° C.) | 89.1 | 128.0 | 105.8 | 88 | 88 |
| | Total light transmittance | | (%) | 92.8 | 92.1 | 92.2 | | 92.2 |
| | Haze value | | (%) | 0.8 | 1.0 | 0.4 | | 0.5 |
| Crack | Evaluation of trimming property | | | ○ | ○ | ○ | x | x |
| resistance | Tensile elongation at break | | (%) | 99 | 70 | 77 | | 5 |
| | Evaluation of bending property | | | ○ | ○ | ○ | x | x |
| Unstretched | Photoelastic constant ($\times 10^{-12}$) | | ($Pa^{-1}$) | 0.20 | 0.11 | −6.25 | 0.93 | 0.15 |
| | Orientation birefringence ($\times 10^{-4}$) | | | −0.07 | −0.04 | −0.26 | ±0.01 | ±0.01 |
| | Re (with respect to 100 μm) | | nm | −0.7 | −0.4 | −2.6 | ±0.1 | ±0.1 |
| | Rth (with respect to 100 μm) | | nm | −1.2 | 0.3 | −6.1 | 0.3 | 0.2 |
| Stretched | Orientation birefringence ($\times 10^{-4}$) | | | −0.45 | −1.26 | −1.53 | 0.14 | 0.15 |
| twice | Re (with respect to 100 μm) | | nm | −4.5 | −12.6 | −15.3 | 1.5 | 1.5 |
| | Rth (with respect to 100 μm) | | nm | −5.3 | −7.0 | −7.4 | 0.3 | −1.0 |

* "±" means that distinction of the sign was impossible.

As shown in Table 3, it is understood that the films of examples are low in both orientation birefringence and photoelastic constant and have an excellent non-birefringent property. It is also found that they are excellent in the trimming property and mechanical strength. Furthermore, it can also be seen that the heat resistance is maintained even if the mechanical strength is high.

Thus, since the molded article formed by molding the optical resin material of the present invention, particularly an optical film, is excellent in optical isotropy even if stretched, it can be used suitably as an optical film for a liquid crystal display and as an optical member such as lenses. Moreover, since the optical film of the present invention has excellent mechanical strength, it is possible to reduce film transport resistance, crack resistance at the time of practical use, and the occurrence of fine cracks in the trimming process during film production. In addition, due to the high mechanical strength of the film, a stretching process required to enhance the film strength is not necessary. Therefore, it is possible to produce a film, for example, a thick film having a thickness of 80 μm or more that is difficult to produce in the case of a stretched film. Furthermore, because the film has high heat resistance, curing temperature and drying speed of the film coating process can be increased, and therefore it is possible to improve the productivity.

The invention claimed is:

1. An optical resin material comprising a graft copolymer (C) obtained by polymerizing a vinyl-based monomer mixture (B) in the presence of a vinyl-based polymer (A) having at least one crosslinked structure layer,
   wherein the graft copolymer (C) has an orientation birefringence of $-15\times10^{-4}$ to $15\times10^{-4}$ and a photoelastic constant of $-10\times10^{-12}$ to $10\times10^{-12}$ $Pa^{-1}$,
   the vinyl-based monomer mixture (B) contains benzyl (meth)acrylate or phenoxyethyl (meth)acrylate or a combination thereof, and another acrylate, and
   the photoelastic constant is a change in birefringence per unit stress, as measured under a stress condition with a load increased from 0 kgf to 4 kgf by an increment of 0.5 kgf.

2. The optical resin material according to claim 1, wherein the vinyl-based monomer mixture (B), when homopolymerized, has an orientation birefringence of $-15\times10^{-4}$ to $15\times10^{-4}$ and a photoelastic constant of $-10\times10^{-12}$ to $10\times10^{-12}$ $Pa^{-1}$.

3. The optical resin material according to either claim 1, wherein at least one layer of the crosslinked structure layer(s) is a soft layer.

4. The optical resin material according to claim 1, wherein the vinyl-based polymer (A) has a (meth)acrylic crosslinked polymer layer.

5. The optical resin material according to claim 1, wherein the graft copolymer (C) has a hard polymer layer.

6. The optical resin material according to claim 1, wherein the graft copolymer (C) has a hard polymer layer having a non-crosslinked structure.

7. The optical resin material according to claim 1, wherein the vinyl-based polymer (A) is formed by polymerizing 50 to 100 wt % of an alkyl acrylate, 50 to 0 wt % of a monomer copolymerizable therewith, and 0.05 to 10 parts by weight of a polyfunctional monomer (with respect to 100 parts by weight of the total amount of the alkyl acrylate and the monomer copolymerizable therewith).

8. The optical resin material according to claim 1,
   wherein the graft copolymer (C) has a soft inner layer having a crosslinked structure and a hard non-birefringent outer layer,
   the soft inner layer has a (meth)acrylic crosslinked polymer layer, and
   the hard non-birefringent outer layer is formed from polymerization of the vinyl-based monomer mixture (B).

9. The optical resin material according to claim 1,
   wherein the graft copolymer (C) has a hard inner layer, a soft intermediate layer, and a hard outer layer,
   the hard inner layer is composed of at least one hard polymer layer,
   the soft intermediate layer has a soft polymer layer of a (meth)acrylic crosslinked polymer, and
   the hard outer layer has a hard non-birefringent polymer layer formed from polymerization of the vinyl-based monomer mixture (B).

10. The optical resin material according to claim 9, wherein the graft copolymer (C) further has a soft innermost layer.

11. The optical resin material according to claim 1, wherein the volume average particle diameter to a crosslinked structure layer located on the outermost side of at least one crosslinked structure layer of the graft copolymer (C) is 20 to 450 nm.

12. The optical resin material according to claim 1 wherein the content of a crosslinked structure polymer of the vinyl-based polymer (A) is 1 to 60 parts by weight with respect to 100 parts by weight of the optical resin material.

13. The optical resin material according to claim 1, further comprising inorganic fine particles having birefringence.

14. The optical resin material according to claim 1, further comprising a low-molecular weight compound having birefringence with a molecular weight of 5,000 or less.

15. The optical resin material according to claim 1, further comprising a resin (D) having an orientation birefringence of $-15\times10^{-4}$ to $15\times10^{-4}$ and a photoelastic constant of $-10\times10^{-12}$ to $10\times10^{-12}$ $Pa^{-1}$.

16. An optical member formed by molding the optical resin material according to claim 1.

17. An optical film made of the optical resin material according to claim 1.

18. The optical film according to claim 17, which is obtained by a melt extrusion method.

19. The optical film according to claim 17, wherein the thickness of the optical film is 10 to 500 μm.

20. The optical film according to claim 17, wherein the orientation birefringence is $-2\times10^{-4}$ to $2\times10^{-4}$ and the photoelastic constant is $-10\times10^{-12}$ to $10\times10^{-12}$ $Pa^{-1}$.

21. The optical film according to claim 17, wherein the glass transition temperature is 80° C. or higher.

22. The optical film according to claim 17, wherein the tensile elongation at break is 10% or more.

23. The optical film according to claim 17, wherein the optical film is an acrylic resin film.

24. The optical film according to claim 17, wherein the optical film is an unstretched film.

25. An optical film, which is formed by stretching the optical film according to claim 17.

26. A laminate, which is formed by laminating the optical film according to claim 15 on a substrate.

* * * * *